United States Patent
Lumelsky et al.

(10) Patent No.: US 6,466,980 B1
(45) Date of Patent: Oct. 15, 2002

(54) SYSTEM AND METHOD FOR CAPACITY SHAPING IN AN INTERNET ENVIRONMENT

(75) Inventors: Leon L. Lumelsky, Stamford, CT (US); Nelson R. Manohar, New York, NY (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/335,273

(22) Filed: Jun. 17, 1999

(51) Int. Cl.[7] .................. G06F 13/00; G06F 11/30
(52) U.S. Cl. ................ 709/226; 709/105; 709/224; 709/231; 709/221; 707/200
(58) Field of Search ................ 709/104, 105, 709/102, 231, 226, 221, 224, 223; 707/200, 201

(56) References Cited

U.S. PATENT DOCUMENTS

| | | | | |
|---|---|---|---|---|
| 5,802,301 A | * | 9/1998 | Dan et al. ................ | 709/223 |
| 6,167,427 A | * | 12/2000 | Rabinovich et al. ........ | 709/201 |
| 6,223,206 B1 | * | 4/2001 | Dan et al. ................ | 709/105 |
| 6,256,675 B1 | * | 7/2001 | Rabinovich ................ | 709/241 |
| 6,317,786 B1 | * | 11/2001 | Yamane et al. ............. | 709/224 |

OTHER PUBLICATIONS

Wei Jie et al.; Dynamic Load–Balancing Using Prediction in a Parallel Object–Oriented System; Proc. of the 15th Int'l Parallel and Distributed Processing Symposium; Apr. 2001.*

Nalini Venkatasubramanian et al.; Load Management in Distributed Video Servers; Proc. of the 17th Int'l Conf. on Distributed Computing Systems; pp. 528–535; May 1997.*

* cited by examiner

Primary Examiner—Kenneth R. Coulter
(74) Attorney, Agent, or Firm—Scully, Scott, Murphy & Presser; Douglas W. Cameron

(57) ABSTRACT

A system and method for dynamically shaping available capacity of multi-media objects based on aggregated demand across distributed media/world-wide-web servers. Demand statistics (e.g., volume and density) for a given web object are used to characterize aggregated behavior with respect to request arrival time. The system dynamically shapes capacity by controlling, over time, the number of replicas of objects made available to such requests as well as the placement of such replicas. The system also enables on-demand replication of web objects across web servers by providing: (a) a ranking criteria to prioritize among web objects according to past demand; and, (b) a trigger criteria to determine when to apply the capacity shaping mechanism. The system effectively allows one or more media servers to share the streaming resources provided by a globally shared media server in such a way that the capacity of each media server is temporarily, and transparently augmented as needed to match predicted demand for its objects.

31 Claims, 15 Drawing Sheets

666

| Object_ID | Replica | Server | Transient Replica | Time-to-Live |
|---|---|---|---|---|
| 420 | 421 | 1211 | NO | |
| | 422 | 1221 | YES | 060599-133000 |
| 440 | 441 | 1211 | NO | |

666

| Object_ID | Replica | Server | Transient Replica | Time-to-Live |
|---|---|---|---|---|
| 420 | 421 | 1211 | NO | |
| | 422 | 1221 | YES | 060599-133000 |
| 440 | 441 | 1211 | NO | |

656   657

| Server | IP Address | Capacity Rating | Utilization State | Timestamp | Globality |
|---|---|---|---|---|---|
| 1211 | 209.09.9.127 | Low | Red | t1 | local |
| 1221 | 128.0.0.1 | High | Green | t2 | global |

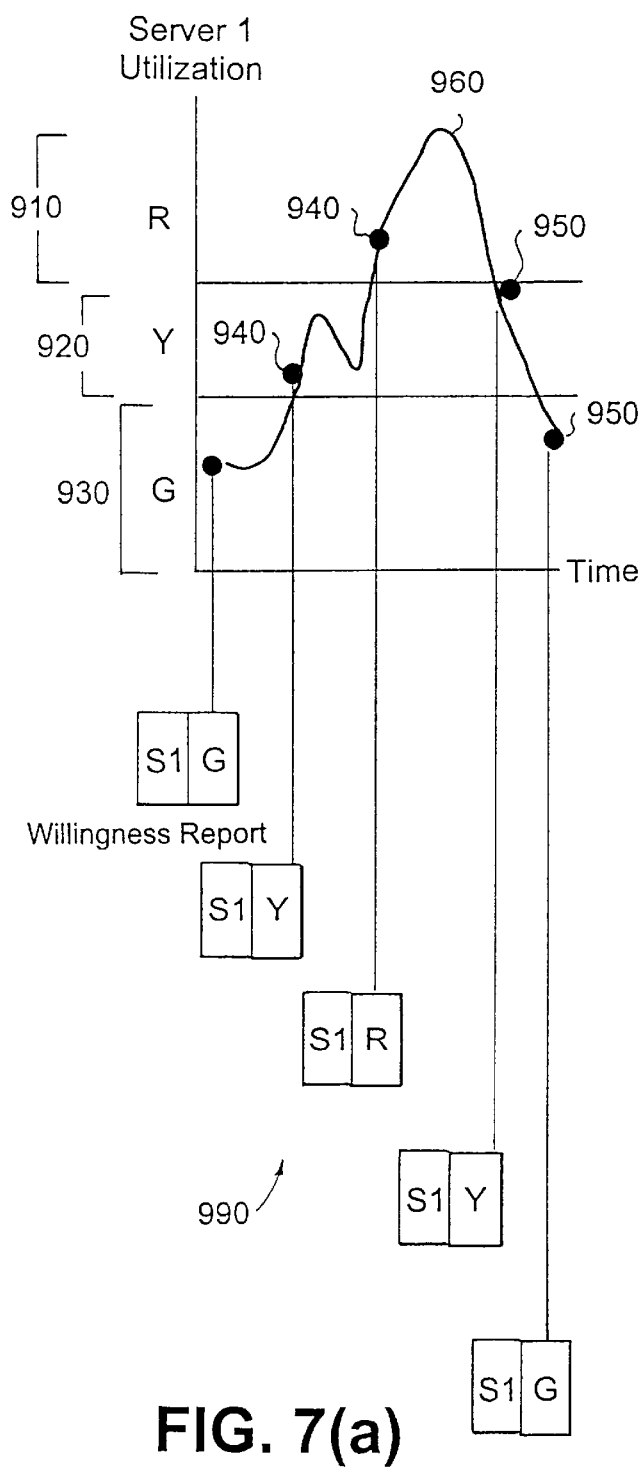
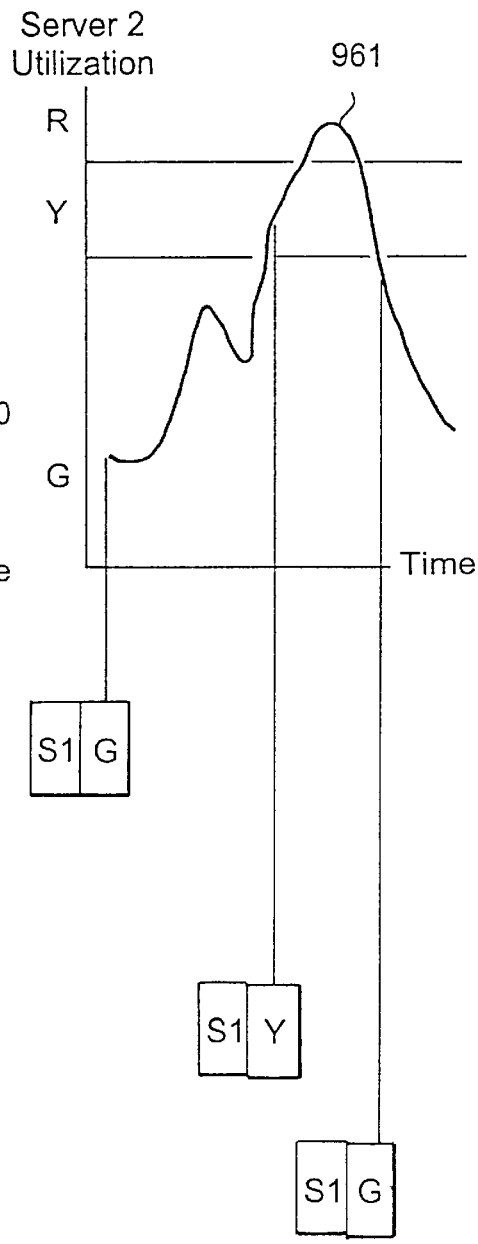
FIG. 7(a)  FIG. 7(b)

696

| ObjectID | Demand rate req/s | Volume $t_{(i-1)}$ req | Volume $t_{(i-2)}$ req | Hot Object | Time Stamp |
|---|---|---|---|---|---|
| 420 | 10 | 120 | 60 | yes | $t_1$ |
| 425 | 5 | 60 | 55 | no | $t_1$ |
| 428 | 5 | 30 | 62 | no | $t_0$ |

FIG. 9(c)

SYSTEM AND METHOD FOR CAPACITY SHAPING IN AN INTERNET ENVIRONMENT

BACKGROUND OF THE INVENTION

1. Field of the Invention

The present invention relates generally to techniques for dynamically reconfiguring finite but relocatable resources in a distributed computer system, and specifically, to a system and method for caching and replicating multimedia content such as objects on multimedia servers distributed throughout the Internet.

2. Discussion of the Prior Art

FIG. 1 illustrates a typical distributed computer system consisting of a plurality of clients (110, 111, 112), a plurality of servers (120, 121, 122), and several independent collections of objects (130, 131, 132). These components are connected by a computer networked environment (160) that enables a client (e.g., 111) to directly place a request message (140) for one or more objects from a server. The system allows such server (e.g., 121) to establish a streaming connection (150) for delivering an object to the requesting client (e.g., 111). This environment is typical of the Internet where a browser represents the client, a web server represents the server, a web site represents the collection of objects, the Internet represents the computer-networked environment. As known, the HTTP protocol provides the ability for a client to request an object from a given server via a location bound identifier referred to as a Universal Resource Locator (URL). The Transmission control Protocol (TCP) provides the ability to stream an object (such as a web page or a video file) from the web server to the client.

FIG. 2 depicts in further detail the components of a server (e.g., 120) as found in the environment depicted in FIG. 1. The server contains a finite amount of local resources (200) comprised of memory (210), CPU (220), disk storage (230), and, network bandwidth (240). The server is associated with a collection of objects (130). In this particular case, the collection is composed of four objects (281, 282, 283, 284). Interactivity with a client such as VCR interactivity during playback (e.g., pause, rewind, stop, fast forward, etc.,), billing, security, etc. are handled by the server's service logic component (250). A signaling protocol (261) (e.g., HTTP) allows the server to receive requests (e.g., 140) from clients. For a client (e.g., 111) to access an object (e.g., 281) on the server's collections, the server allocates a portion of its resources (200) to the corresponding streaming connection (150). Because resources are finite, a local admission control process (260) is used to determine whether an incoming request can be served. A local resource management process (270) is used to reserve, access, monitor, and de-allocate local resources (200) in the server (for example, disk storage (HDD), bandwidth (B), CPU cycles (CPU), memory (MeM), etc. such as depicted in FIG. 2). The network streaming process (275) relies on a streaming protocol (271) to deliver content to its clients by establishing and managing streaming connections (e.g., 150) to clients. Management of resources at any particular server (e.g., 120) is completely independent from management of resources at any other particular server (e.g., 121). Furthermore, collections (e.g., 130 and 131) at different servers are independent from each other. In particular, though copies (281, 285) of the same object, e.g., object "O4" may exist on two different collections (130, 131) at different servers (120, 121) there exists no means of relating these copies (281, 285) to each other.

As depicted in FIG. 3, the distributed computer system 10 (of FIG. 1) may employ an object directory service 300 embodied as an object request broker (ORB) which provides the directory service over a collection of object sites (e.g., 130, 131, 132), and, extends location transparency to clients (e.g., 110, 111, 112) requesting objects (e.g., a media content file 04) from the distributed object collection (130, 131, 132). An object directory service (300) provides information necessary to locate any object throughout the computer-networked environment (160). The directory (310) employed particularly tracks the server associated with an object. For example, the first directory entry illustrates that object 281 is found on server 120 whereas the second directory entry illustrates that object 285 is found on server 121.

The task of leveraging the increased availability of widely distributed content and resources becomes very important with the proliferation of the next generation of the Internet, e.g., Internet2. The emerging Internet projects address the creation of a leading edge network for a new generation of applications that fully exploit the capabilities of broadband networks. Very high bandwidth and bandwidth reservation will allow materials such as continuous digital video and audio to move from research use to much broader use and include images, audio, and video in a way currently not possible. In such a widely distributed environment, accountable, efficient, and self-regulated management of resources will be desirable and most importantly, necessary.

The driving force behind the movement of Internet to the next generation is the commercialization of rich multimedia content. Digital library collections produced by corporations, entertainment material created by movie studios, and interactive instructional presentations developed by universities are soon to be available over the Internet, thus creating a new and broad source of revenue.

The emerging Internet relies on the bandwidth, which is on the order of several magnitudes larger than current Internet provides. It also alleviates network resource management and QoS control by introducing correspondent reservation and monitoring mechanisms. However, it is clear, that to date, mechanisms for the collective management of multiple media connections that efficiently leverage the sharing of resources across multiple servers in a wide area network are not found.

There is envisioned three major conditions for successful commercialization of those newly arising applications: first, mechanisms need be provided to allow paying users to establish a contract with service providers to reserve required infrastructure components and resources at a mutually agreed price for which providers establish and support a guaranteed quality of service; second, the resources supply would have to be sufficient to meet random changes of the demand, which may be completely unpredictable during architectural studies; and, third, service providers should safely rely on the system for effective security, rights and royalties management, accounting and billing for the consumption of dynamically re-configurable distributed virtual resources.

The current focus of resource management in the today's Internet, if any, relates to the setup and management of individual and independent media connections to server resources. However, the danger of this approach becomes clear when the presentations reuse multiple primary sources of content. To enforce the necessary quality as well as to control the usage and distribution when reusing multiple sources of content, two approaches are possible. One approach is to copy all content onto a single server (or a cluster of servers) during authoring, and replicating, as necessary, the final result to as many servers according to predicted demand. Primary content providers would then establish copyright charges, based on a-priori market analysis. On the positive side, the control of distribution, security, and billing functions become much easier, than in case of distributed content. On the negative, if the demand is estimated incorrectly, the profit is not maximized for either primary or secondary (i.e., reuse) content providers. Finally, the most dangerous problem is that this approach leads to over-engineering of resources while it does not prevent dropout of excessive requests. Such an approach is typical for today's Internet, because current multimedia content is generally not memory hungry, as compared with emerging multimedia applications.

Another approach would be to reassemble content on a need basis, for both authoring and dissemination. It would allow content to be stored once, but used as many times as necessary, establish charges proportionally to content and resources usage, and alleviate storage demand. However, it requires a system to dynamically manage multiple and frequently heterogeneous resources. In addition, this approach exacerbates security, and resource engineering. A demand for the particular segment can not be predicted at all, because this segment may be used in completely different, even orthogonal applications. Now, if the demand for a single segment can not be met, multiple applications are affected. The latter approach, however, is the only sensible way to be used by future Internet, because from the resource point of view, it is the most economical, and serving a maximum number of users.

Thus, it would be highly desirable to provide a system and method that allows all three major commercialization conditions to be satisfied.

There are a number of publications and patents in the area of QoS-driven resource management. Most of the work has been focused on either the network, as described in U.S. Pat. No. 5,388,097 issued Feb. 7, 1995 to Baugher, M. J. et al., and entitled "System and Method for Bandwidth Reservation for Multimedia Traffic in Communication Networks," and U.S. Pat. No. 5,581,703 issued Dec. 3, 1996 to Baugher, M. J. et al, and entitled "Method and Apparatus for Reserving System Resources to assure Quality of Service"; or, the operating system, such as described in the reference "An Architecture Towards Efficient OS Support for Distributed Multimedia", Proceedings of IS&T/SPIE Multimedia Computing and Networking Conference '96, San Jose, Calif., January 1996 by David K. Y. Yau and Simon S. Lam. With the proliferation of multimedia services on Internet, it was soon realized that while IP networks were able to provide a simple, best-effort delivery service, the IP protocol is not suited for use with new real-time applications, such as multimedia streaming, Virtual Reality applications, distributed supercomputing. As a result, new network protocols, such as Resource Reservation Setup Protocol (RSVP) (See, e.g., "The Grid: Blueprint for a New Computing Infrastructure," Edited by Ian Foster and Carl Kesselman, Chapter 19, pp. 379–503, Morgan Kauffman Publishers, 1999); Real Time Transport Protocol (RTP); Real Time Transport Control Protocol (RTCP) and others, were developed (See, e.g., William Stallings, "High-Speed Networks: TCP/IP and ATM Design Principles", Prentice Hall, 1997; and, I. Busse, B. Deffner, and H. Schulzrinne, "Dynamic QoS Control of Multimedia Applications based on RTP", Computer Communications, January 1996), enabling applications to request and negotiate network QoS parameters, such as bandwidth and latency. Deployment of those protocols on the current Internet has not been successful, firstly because it required upgrading all the non-RSVP routers and servers system software. Secondly, even if RSVP were deployed on the current Internet, very limited bandwidth and computing resources would still have been the bottleneck for successful deployment of real-time applications. The current Internet was built on the backbone, enabling cross-country communications on relatively unclogged T3 (45 megabit per second). Proliferation of graphic pages, and streaming audio and video applications depleted those resources quite fast. Even worse, the rate of user's population growth is considerably higher than newly build network resources.

The National Science Foundation and MCI Corporation, responding to the emerging needs of Internet community has been building a new network, called vBNS (very-high-performance Backbone Network Service). This nationwide network also provides a backbone for the two foundations, university-led effort called Internet 2 and by federal research agencies, called New Generation Internet. The vBNS allows most of the connected institutions to run at 622 million bits per second (OC12). By the year 2000, vBNS is expected to operate at 2.4 gigabits per second (2,400 megabits per second) by the year 2000.

The vBNS system exploits RSVP protocol to support two distinct classes of services: a Reserved Bandwidth Service, i.e. a service with bandwidth commitment, and a traditional best-effort IP service (See, e.g., Chuck Song, Laura Cunningham and Rick Wilder, "Quality of Service Development in the vBNS", MCI Communications Corporation, provided at the URL http://www.vbns.net/presentations/papers/QoSDev/ieeeqos.htm. Still, resource management at the network layer for vBNS is done separately from operating system layer and in isolation from application needs and availability of the end-resources, such as storage and computing resources.

A new breed of high performance applications such as remote surgery, robotics, tele-instrumentation, automated crisis response, digital libraries of satellite data, distance learning via multimedia supported Web sites, enhanced audio, and video, is emerging. However, to accommodate such high performance applications and their continuous media flows, it is not enough to increase or reserve network capacity. These new applications require end-to-end resource reservation and admission control, followed by co-ordination of distributed functions such as: (a) resource scheduling (e.g., CPU, disk, etc.) at the end-system(s), (b) packet scheduling and flow control in the network, and (c) monitoring of the delivered end-to-end quality of service. It is essential that quality of service is configurable, predictable and maintainable system-wide, including the end-system devices, communications subsystem, and networks. Furthermore, all end-to-end elements of distributed systems architecture must work in unison to achieve the desired application level behavior.

Up do date, there has been considerable effort in the development of end-to-end quality of service support. Among them are Heidelberg QoS Model, developed within HeiProject at IBM's European Networking Center and described in the reference entitled "HeiRAT—Quality of Service Management for Distributed Multimedia Systems", Multimedia Systems Journal, 1996 by Volg, C., Wolf, L., Herrtwich, R. And H. Wittig; an Extended Integrated Reference Model (XRM), developed by COMET group at Columbia University such as described in the reference entitled "Building Open Programmable Multimedia Networks", Computer Communications Journal, Vol. 21, No. 8, pp. 758–770, June 1998 by Campbell, A. T., Lazar, A. A., Schulzinne, H. And R. Stadler; OMEGA end-point architecture, developed as the interdisciplinary research effort in the University of Pennsylvania such as described in the reference entitled "Design, Implementation and Experiences of the OMEGA End-Point Architecture", Technical Report (MS-CIS-95-22), University of Pennsylvania, May 1995 by Nahrstedt K. And J. Smith; in-serv Architecture which is a contribution of the Internet Engineering Task Force (IETF) such as described in the reference entitled "A Framework for End-to-End QoS Combining RSVP/Intserv and Differentiated Services," Internet Draft, IETF, March 1998 by Bernet Y, et al.; the Quality of Service Architecture QoS-A, developed by A. Campbell, and presenting an integrated framework dealing with end-to-end QoS requirements such as described in the reference entitled "A Quality of Service Architecture", PhD thesis, Lancaster University, January 1996 by Andrew T Campbell. Another reference which analyzes the above mentioned QoS paper is entitled "A Survey of QoS Architectures", ACM/Springer Verlag, Multimedia Systems Journal, Special Issue on QoS Architecture, Vol. 6, No. 3, pp. 138–151, May 1998 by Aurrecoechea, C., Campbell, A. T. and L. Hauw.

Substantial work has been done by SRI International, developing an End-to-End Resource Management of Distributed Systems (ERDoS), which enables adaptive, end-to-end, scalable resource management of distributed systems such as described in the reference ERDOS QoS Architecture, Technical Report, SRI International, May 1998. An extensible Resource Specification Language (RSL) and the resource management architecture has been implemented within Globus meta-computing toolkit, and used to implement a variety of different resource management strategies such as described in Czajkowski, K., et al., "A Resource Management Architecture for Metacomputing Systems" Proc. IPPS/SPDP '98 Workshop on Job Scheduling Strategies for Parallel Processing, 1998; and Foster, I., Kesselman, C., "The Globus Product: A Status Report" Proc. IPPS/SPDP '98 Heterogeneous Computing Workshop, pp. 4–18, 1998.

While the architectures described in the above-mentioned references are directed resource reservation and management of end-to-end resources, they generally assume a single, even geographically limited network subsystem which provides bounds on delay, errors and meet bandwidth demands, and an operating system which is capable of providing run time QoS guarantees. However, the next generation Internet must be viewed not as only a network of networks, but first and foremost a system of distributed systems. In this paradigm, not only the communication resources, but also the computing and storage servers are shared among many users.

Thus, the architectures mentioned above do not provide a coordinated management of overall system resources as a function of request activities for individual content and computing resources. It deals with resources pre-assigned to particular services. Consequently, quality of service must be degraded in response to growing volume of requests for such services over and above an established limit. As the above-mentioned architectures focus on providing QoS as requested by application, they do not take an advantage of a possible aggregation of resources due to commonality between user requests for a particular service.

For example, it would be desirable to determine commonality for the usage history of a particular multimedia content, e.g., bursts of requests within short time intervals, the proximity of origination addresses of requests, etc. In addition, the architectures described above do not allow for dynamic monitoring and recording of resource consumption for individual services as well as for groups of related services, with the purpose of calculating cost of service for individual clients.

Thus, it would be highly desirable to provide a mechanism capable of providing an adaptive resource management function for distributed resources that could, on-demand, shape system capacity to the needs of the environment where such mechanism is suited for the next generation of the Internet.

SUMMARY OF THE INVENTION

It is an object of the invention to provide a system and method for managing and controlling the distribution, sharing and pooling of resources in an Internet/World Wide Web environment, and for managing the placement of objects onto servers according to a set criteria such as predicted aggregated demand for objects.

The present invention resolves the above problems by introducing an intermediary control node (herein referred to as the controller) between clients and servers that provides mechanisms capable of modifying available capacity on servers in terms of the placement and number of objects made available on these servers in accordance to some set criteria. In particular, the present invention comprises a capacity shaping mechanism for matching predicted aggregated demand for objects to available capacity. To this end, predicted demand statistics are generated by analyzing the aggregated request stream presented to the intermediary control node whereas available capacity is loosely estimated by a special protocol between servers and the controller node.

More particularly, the present invention introduces the notion of a global server which provides a spare, shared, and highly available capacity that can be used to assist a multimedia server by temporarily increasing the overall system capacity associated with some particular multimedia object to match its predicted demand. The present invention additionally introduces the notion of a transient replica which replica acts as a migrating object of limited lifetime that responds to demand and capacity conditions. To do so, the controller node monitors demand and capacity and uses, creates, and deletes transient replicas from global servers. These complementary notions are used to provide a system and method to dynamically control the placement and number of replicas on an Internet/web environment. It should be noted that the creation of a transient replica does not reserve resources at a global server. Instead, on-demand replication is rather used as a tool to increase the likelihood of finding an available replica during the processing of subsequent requests for the same object. For this reason, the present invention is particularly suited for virtual proximity of computational and storage resources on the next generation of the Internet.

Advantageously, the system of the invention achieves capacity shaping for matching predicted aggregated demand for objects to available capacity while preserving the autonomy of servers over the control of their resources. That is, the resource management system is decentralized in that resource management controls (e.g., admission control, resource reservation, resource measurements, resource scheduling, etc.,) are implemented locally, at each server, and not centralized at the controller. Controllers do not directly manage servers and their resources. Instead, controllers represent agents that forward capacity shaping control recommendations to servers. This is achieved without imposing stringent monitoring requirements on the controller about the state of resources and servers on the system. Signaling protocols between servers and controller allow controllers to maintain resource management state during run-time in a fault tolerant way. The system tradeoffs signaling overhead against state maintenance overhead.

BRIEF DESCRIPTION OF THE DRAWINGS

Further features, aspects and advantages of the apparatus and methods of the present invention will become better understood with regard to the following description, appended claims, and accompanying drawings where:

FIG. 7(a) illustrates a specific watermark strategy used by a server to associate its utilization state into a normalized willingness indicator that the controller can use across all servers.

FIG. 7(b) shows the application of the same watermark scheme by a different server.

FIG. 9(c) illustrates via an example the demand statistics stored by the controller corresponding to FIGS. 9(a) and 9(b).

DETAILED DESCRIPTION OF THE PREFERRED EMBODIMENT

Figures 4, 6A, 6B:
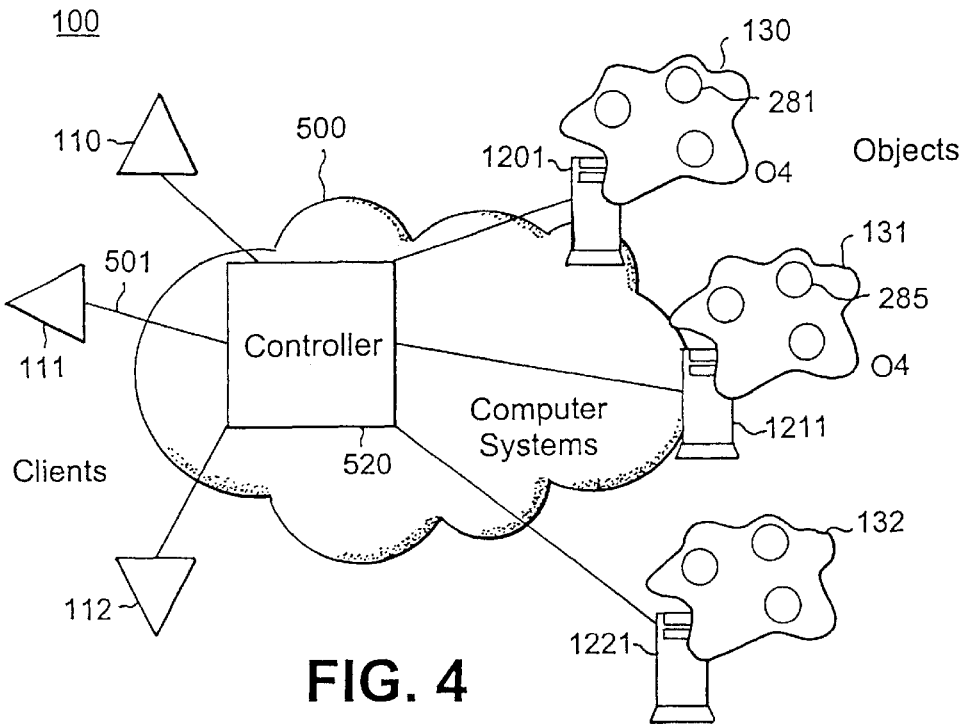
FIG. 4 illustrates a distributed computer system 100 according to the preferred embodiment of the invention that includes an intermediary controller device for handling requests from clients.
FIG. 6(a) illustrates an example replica directory (666) including schema and data associated with the replica directory.
FIG. 6(b) illustrates an example server directory (656) including schema and data associated with the server directory.

FIG. 4 illustrates a distributed computer system 100 according to the preferred embodiment of the invention comprising clients (110, 111, 112, etc.,), servers (1201, 1211, 1221), object collections (130, 131, 132), and object requests (500) from clients. As shown in FIG. 4, the distributed computer system additionally comprises an intermediary controller (520) for handling requests from clients. The controller (520) particularly places requests (e.g., 501) from a client (e.g., 111) onto a server (e.g., 1211) according to some set criteria as described in greater detail in commonly-owned, co-pending U.S. patent application Ser. No. 09/335,272 entitled SYSTEM AND METHOD FOR INTEGRATED LOAD DISTRIBUTION AND RESOURCE MANAGEMENT ON INTERNET ENVIRONMENT, the whole contents and disclosure of which is incorporated by reference as if fully set forth herein. For example, in the preferred embodiment the controller is used to introduce load balance and fault tolerance over the placement of client requests across the distributed object collections (130, 131, 132). Furthermore, as will be described in greater detail herein, the intermediary controller manages the plan n of multimedia objects themselves onto servers according to some set criteria as will be described in greater detail herein.

According to the invention, implementation of the intermediary controller (520), and particularly, an object directory service, such as an ORB, enables characterization of the system 100 as a distributed collection of objects as opposed to a collection of servers. Thus, unlike the prior art system 10, the various collections of objects (130, 131, 132) found at each independent server (1201, 1211, 1221) aggregate now into a distributed collection (130, 131, 132) of objects and object replicas which model a multimedia object as a scalable and relocatable resource in accordance with demand and capacity conditions. For example, FIG. 4 shows object replicas (281, 285) associated with object O4 with one replica (281) found on the collection (130) on server (1201) and the other replica (285) found on the collection (131) on server (1211). As will be described in greater detail herein, servers may be considered as local which maintain persistent (object) replicas, or global, which maintain transient replicas. Global servers are dedicated for providing a spare, shared, and highly available capacity for maintaining replicated (transient) objects.

As referred to herein, the temporal sequence of client requests presented to the controller (520) is the request stream or demand. A successful client request (e.g., 140) results in a streaming connection (e.g., 150) (herein also referred to as a stream). Given a particular request for some multimedia object, the measure of the number of concurrent streams that may be made available by such a server given the available resources is herein referred to as the available capacity of a multimedia server. Furthermore, as understood by the controller (520), the measure of the number of streams (of a requested multimedia object) that may be supported across the overall system at a current time is also herein referred to as the available capacity. In the present invention, means are provided to efficiently estimate remaining available capacity for a particular multimedia object. In particular, in the preferred embodiment, statistical measurements are used to loosely estimate available capacity in an efficient manner in a wide area network distributed environment such as those expected of the emerging Internet2.

It should be noted that standards for controlling multimedia streaming data over the World Wide Web such as H.323 and Real Time Streaming Protocol (RTSP) are already in place and implemented to provide the streaming capabilities they are intended for. Whereas H.323 is designed for videoconferencing across small groups, RTSP is designed to efficiently broadcast audio-visual data to large groups. Each standard describes a client-server application-level protocol for controlling the delivery of data with real-time properties. For example, the RTSP establishes and controls either a single or several time-synchronized streams of continuous media, such as audio and video and uses transport protocols such as UDP, multicast UDP, TCP, and Real Time Protocol (RTP) to deliver the continuous streams.

Figure 5:
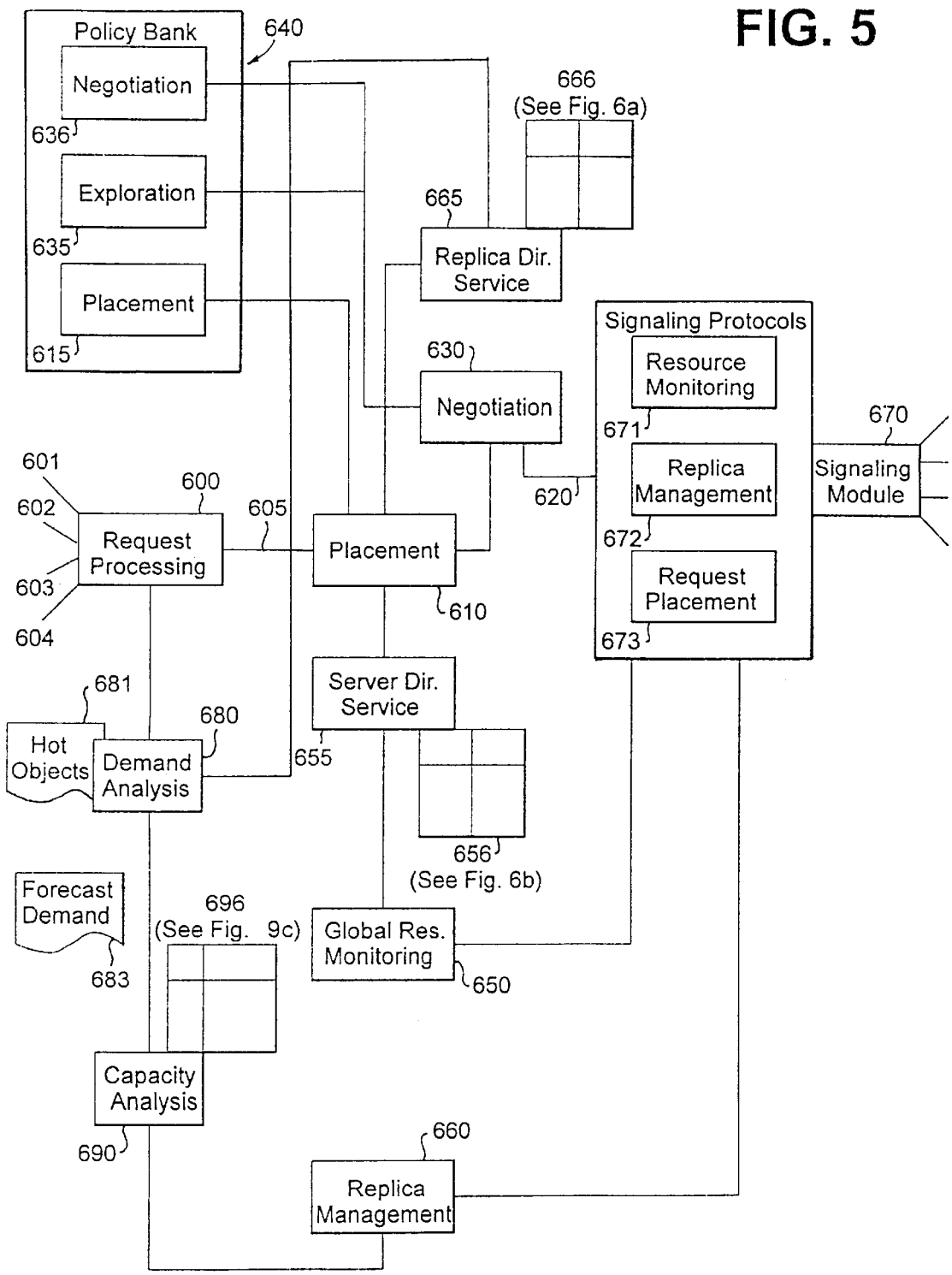
FIG. 5 illustrates a block diagram depicting the major components of the controller device.

FIG. 5 is a detailed block diagram of the intermediary controller device (520) implemented for managing the placement of multimedia objects themselves onto servers. As shown in FIG. 5, a request processing module (600) is provided for receiving requests (601, 602, 603, 604) from clients, the requests including a unique object identifier, and feeding these requests to a placement module (610). The placement module (610) applies a placement policy (615) to each request and generates a set of tentative placement queries (620) for the request. Particularly, the placement module (610) interfaces with both a replica directory service (665) (for maintaining the replica directory 666 as described herein with respect to FIG. 6(a)) and a server directory service (655) (for maintaining the server directory 656 as described herein with respect to FIG. 6(b)) to generate the tentative placements (620). That is, the placement module (610), replica directory service (665), and replica directory (666) operate in conjunction to locate all replicas associated with the given object identifier of the received request. Further, the placement module (610), server directory service (655) and server directory (656) operate in conjunction to determine the willingness of any such location (holding a replica) to consider new placement inquiries (620).

FIG. 6(a) depicts an example replica directory (666) maintained by the replica directory service (665) and including schema and data associated with a replica directory implemented by the system 100 of the invention. An object identifier (e.g., 420) is assigned to each different object (e.g., O4, etc.) in the distributed collection for uniquely identifying an object throughout the distributed collection. According to the invention, original client requests may be pre-processed by an auxiliary system (not shown) capable of transforming an ambiguous request from a client into a uniquely identifiable object identifier. For each object identifier, one or more replicas may exist throughout the distributed collection. For example, in FIG. 6(a) there is illustrated the case of two different object identifiers (420, 440). Whereas the first object identifier (420) is currently associated with two replicas (421, 422), the second object identifier (440) is associated with only one replica (441). Replicas for the same object identifier are distributed across different servers. For example, the replicas (e.g., 421, 422) of object identifier (420) reside on different servers (1211, 1221), respectively. Additionally associated with each object replica is a time-to-live timestamp which indicates the degree of transiency of the replica. As will be described in greater detail herein, when the time-to-live deadline has expired, a request to prolong the object replica's existence at the global server is initiated.

As the replica directory (666) needs to be resilient to failures, data about persistent replicas and their associated local servers may be safely checkpointed without substantial risk of loss of data. However, only data about transient replicas is volatile. To recover from a loss of data about transient replicas, a data initialization protocol may be implemented allows the controller (520) to query any particular global server for a list of all of its transient replicas. By querying each global server in the controller's domain, it is possible for the controller to re-populate the replica directory on demand. It should be noted that the list of global servers may be checkpointed as well to avoid risk of loss of data. A skilled artisan will appreciate that replicas unaccounted for after the re-population of the replica directory (666) will observe increasingly less utilization as no further requests will be placed onto this particular global server by this controller.

Further shown in FIG. 6(a) and described in greater detail herein, the replica directory maintains statistics associated with requests for each object identifier including: the predicted demand "d," the dominating geography indicator "g" describing a dominating geographical area associated with requests, and a demand volume statistic or rate "r". Furthermore, a time-to-live timestamp is associated to each replica. Once the timestamp expires, the global server currently owning the transient replica requests a renewal from its controller (i.e., the controller who placed this replica). At this point, the controller could either drop the replica by denying its renewal or renew it by extending its time-to-live (thus re-populating the database with this new replica). If the controller denies the renewal, then the transient replica could end up being deleted by its global server.

FIG. 6(b) depicts an example server directory 656 maintained by the server directory service (665) and including schema and data associated with the server directory. A server identifier (e.g., 1211) is assigned to each different server in the distributed computer environment (160). The server identifier is assumed to be fixed and not to be changed. Examples of possible server identifiers are the server's fixed IP address or hostname (e.g., Name1 (1211) and Name2 (1221)). For each server identifier, a special field referred to as the server's capacity rating is used to rate the overall capacity of the server. That is, the capacity rating is used by the controller to differentiate between servers having substantially different resources. In the preferred embodiment, a two-tier rating is used. The preferred embodiment differentiates between two capacity ratings: HIGH (e.g., supercomputer/mainframe) and LOW (e.g., an NT-class server), however, a skilled artisan will appreciate that possibly other different rating schemes could be used instead. The capacity rating is an inherent parameter of a server and it is set during initialization. For example, a default rating for a server may be a LOW capacity. According to the invention, the capacity rating allows the controller to differentiate between high and low capacity servers without requiring the controller to track the actual available capacity on a server. Global servers for maintaining replicated (transient) objects receiving are typically HIGH capacity servers.

Additionally, for each server identifier, a special field is used to store the last reported utilization/willingness state for that server (for example, server (1211) is RED whereas server (1221) is GREEN. In addition, for each server, the time of its last utilization/willingness state report received by the controller is also stored. For example, in FIG. 6(b), server (1211) has associated timestamp t1 whereas server (1221) has associated timestamp t2. Last, a field indicates whether the server is a global server or a local server. For example, the server (1211) is known by the controller to be a local server whereas the server (1221) is known to be a global server. It should be understood that a server can be both global and local, in such case, two different entries would be used. One entry would describe the virtual local server and another would describe the virtual global server.

Referring back to FIG. 5, the controller (520) further includes a negotiator module (630) provided for choosing one or more tentative placements (620) and executing a query strategy to query the servers associated with those tentative placements. The resulting query strategy (620) is produced according to an exploration policy (635) and a negotiation policy (636). The negotiation policy is implemented to refine multiple tentative placements and enable choosing based on some criteria such as cost. A policy bank (640) is used to store and load the various policies (e.g., 615, 635, 636) and allows customization of the controller algorithms as described herein. It should be understood that these policies may either be loaded during initialization or on-demand.

As further illustrated in FIG. 5, the controller (520) is further provided with a global resource monitoring module (650) for monitoring the servers. Resource monitoring data is provided by the server directory service (655). A replication management module (660) is provided for applying heuristics to manage the lifecycle of a replica, and particularly determine whether a replica ought to be created, destroyed, or moved. Replica data is provided by the replica directory service (665). A control signaling module (670) provides an interface to servers via three signaling protocols: a resource management protocol (671), replica management protocol (672), and placement management protocol (673). The placement module (610) operates in conjunction with the placement management interface (673) to compose and forward the placement inquiries (620), according to a placement (615) or exploration policy (635), to one or more of such willing and capable locations. The negotiation module (630), negotiation policy module (636) and placement management interface module (673) operate in conjunction to: choose and secure a candidate admission into a guaranteed admission from among a set of positively acknowledged candidate admissions; to invalidate all other candidate admissions for servers other than from the server previously chosen; and, invalidate all other pending placement inquiries.

Further provided as part of the controller device (520) is a demand analysis module (680) for examining the stream of requests (605) and generating a list of the most requested objects (681), hereinafter referred to as "Hot Objects", the most dominating geographies (682) for these objects, and, forecasts about their demand (683). These statistics are fed to the replica management module (660). A capacity analysis module (690) examines available capacity for each of the most requested objects and feeds available capacity to the replication management module (660).

According to the invention, the controller (520) has several degrees of freedom in matching demand to capacity. First, it controls and shapes the distribution and placement of requests onto servers. Second, it controls and shapes the distribution and placement of replicas across servers according to some set criteria. Last, the controller is capable of dynamically creating, destroying, and moving replicas across servers as deemed necessary by the mechanisms of the present invention in order to achieve its goals.

Request Management System

As described in greater detail in aforementioned commonly-owned, co-pending U.S. patent application Ser. No. 09/335,272, the system enables the placement of a request (e.g., 601), given a unique object identifier, onto a server (e.g., 1211) having a replica of the requested object, via the intermediary controller nodes. Preferably, the controller device (520) implements several mechanisms to dynamically reshape demand.

To this end, the controller also acts as a statistics gathering point. In particular, two types of statistics—demand statistics and capacity statistics—are maintained by the controller. On one hand, demand statistics are used by the controller to describe characteristics about the past requests. In the preferred embodiment, predicted demand statistics are generated by the controller by analyzing the aggregated request stream from different clients as observed by that particular controller. For example, statistics are generated to characterize the density of the demand and the volume of the demand. On the other hand, capacity statistics are used by the controller to describe characteristics about the capacity of multimedia servers to accept placements for multimedia objects. In the preferred embodiment, available capacity is loosely estimated by servers and forwarded to the controller (520) as deemed necessary by a server.

Figure 8:
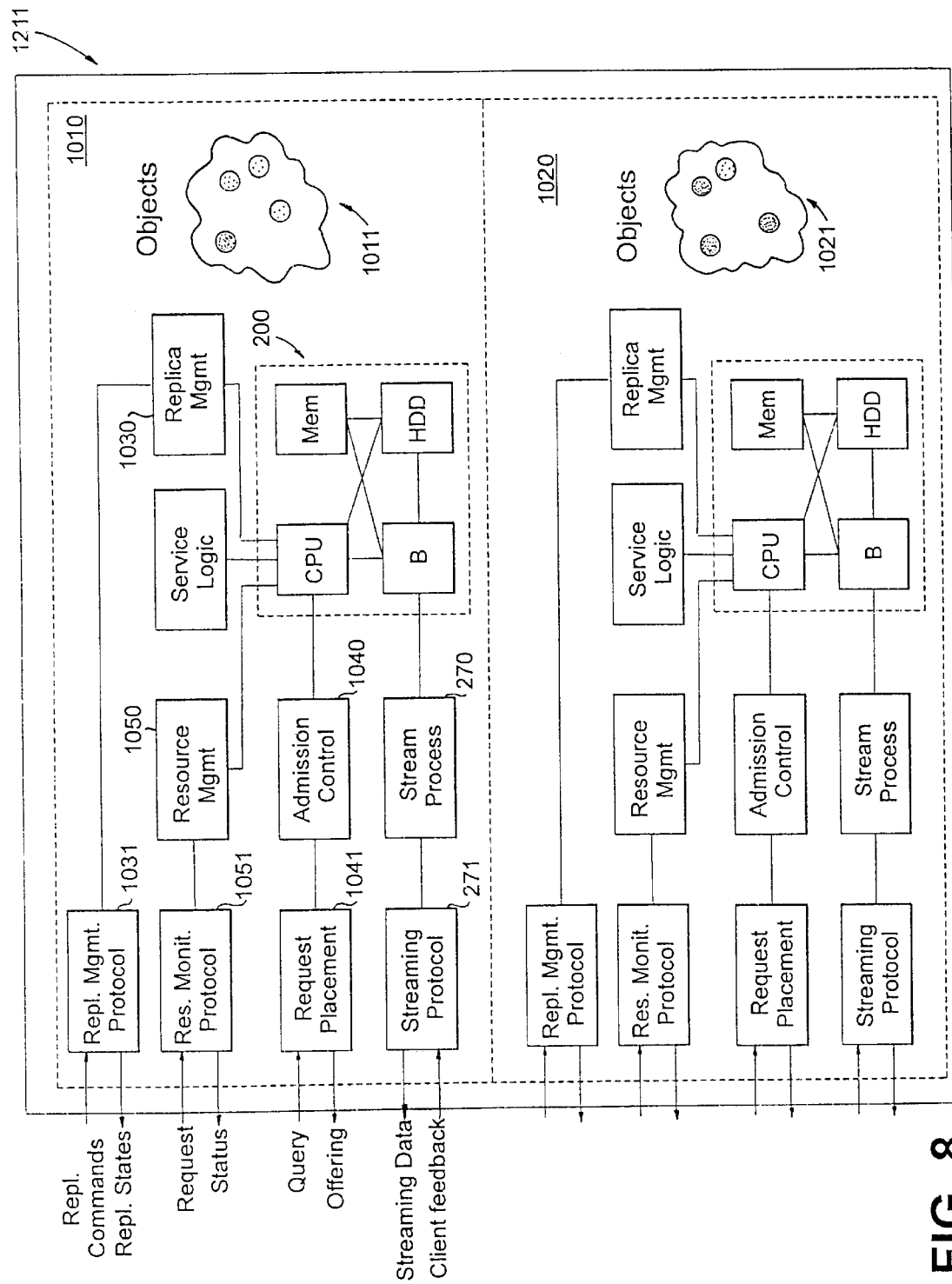
FIG. 8 illustrates in further detail the modification of a server device 1121 according to the invention.

Furthermore, the request management subsystem is decentralized in that admission controls are implemented locally at each server. That is, as shown in FIG. 8, each server (e.g., server 1211) is provided with an admission control mechanism (1040, 1041) enabling a server to grant or deny a candidate admission to a placement inquiry request and acknowledge this back to the controller. The admission control mechanism (1040, 1041) further functions to promote a candidate admission into a guaranteed admission, and, to invalidate a candidate admission. The controller device (520) does not perform any admission nor resource reservation tasks.

As described in greater detail in aforementioned commonly-owned, co-pending U.S. patent application Ser. No. 09/335,272, a signaling protocol between controllers, clients, and servers, herein referred to as the placement management protocol, is used between these distributed parties to allow the controller (520) to place a client request onto a server. The protocol comprises the implementation of at least the following messages: a CID_REQUEST message used by the client to submit a request to the controller, CID_QUERY, message used by the controller to explore candidate placements across severs; and CID_PLACE message used by the controller to request the promotion of a candidate placement into a guaranteed placement. In addition, each of these messages is associated with an acknowledgment message CX_ACK which message is used by a signaling party to respond to any of the above asynchronous messages: CID_REQUEST, CID_QUERY, and CID_PLACE. Thus, for a CID_QUERY message, the CQ_ACK message returns a positive acknowledge indicating that a candidate admission has been granted. The message indicates the expiration deadline of the admission. A skilled artisan should appreciate that this expiration deadline may be configured on a per-server basis to differentiate the aggressiveness of a server in pursuing a new placement. Furthermore, in some embodiments, it may be possible to make this deadline variable over time based on the available capacity of the server. For a CID_PLACE message, the CP_ACK message relays a flag indicating whether or not the candidate admission has been promoted into a guaranteed admission.

In general, the process of mapping a request onto a server is decomposed into three stages by the controller. First, the controller proceeds to identify one or more servers, if any, from those servers that contain a replica of the requested object that are known to be willing to consider admission queries. Second, the controller proceeds to query one or more of these servers with an admission query under some selected parameters possibly provided to the controller in the CID_REQUEST message. In the present invention, this process can iterate until an agreement is negotiated between server and controller with possibly the intervention of the client. Last, the controller proceeds to place the request into one of the servers found to be capable in the previous step.

Aggregation-Driven Response

As mentioned, the system of the present invention is enabled to match server capacity to predicted demand. To this end, the invention implements the controller (520) for resource management by monitoring demand and monitoring capacity in the aforementioned distributed computer system, as herein described in greater detail herein. Particularly, the controller attempts to match predicted aggregated demand for replicas to available capacity on servers and placement of replicas on servers. Predicted demand statistics are generated by analyzing the stream of requests from different clients. Available capacity is estimated by monitoring and querying servers.

The controller stores persistent and dynamic state and data about objects, replicas, servers, requests, and their placements. For example, in the preferred embodiment, directory services are used to store data about the demand for a particular object, the location of its replicas, the capacity of a given server, and the time distribution of requests. As mentioned, tracking the location of each replica is accomplished via the use of the controller's replica directory service (665). Given a unique object identifier (730), a lookup to this directory (666) (FIG. 6(a)) returns the location of all corresponding replicas on the system. In the preferred embodiment, the location of a replica is represented as just a server address (such as a hostname or an IP address). It should be noted that, only one replica per server is needed.

The selection of which objects are valid replication candidates, i.e., "hot objects," is made according to criteria such as the predicted demand for an object identifier. In the preferred embodiment, the selection of replication candidates is driven by an online analysis of aggregated predicted demand against available capacity. That is, replica management attempts to match predicted demand to available capacity.

Figure 9A:
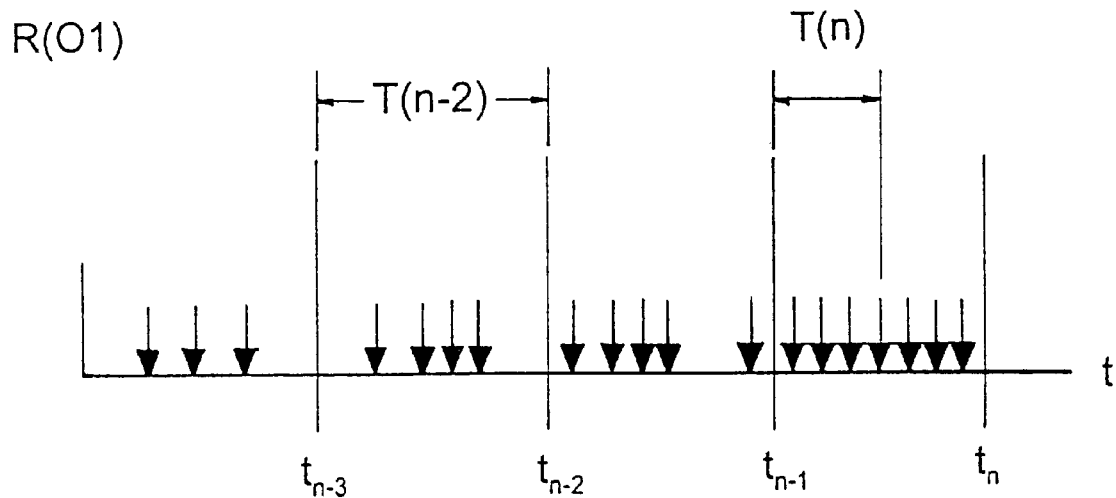
FIG. 9(a) illustrates a stream of requests as observed by a controller and the use of bounded time intervals for the generation of demand statistics.
Figure 9B:
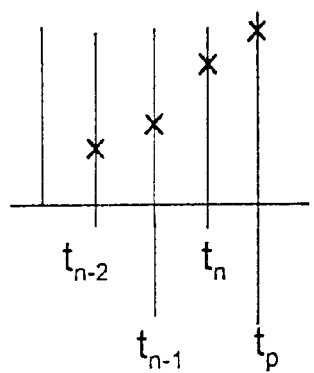
FIG. 9(b) illustrates via an example, a method used in the preferred embodiment to generate the geography density indicator for the request stream shown in FIG. 9(a).

As mentioned, in the preferred embodiment, statistics are maintained about the distribution of requests for each particular object identifier. Demand statistics provide information about the relative demand for an object identifier and enable the ranking of object identifiers in terms of demand. In particular, statistics characterized for each object include: 1) the density of the demand; and, 2) the volume of the demand. The controller maintains demand statistics for each object on the distributed collection. Demand statistics for a particular object are updated on each request for such object. In particular, the controller flags objects found to be in high demand (i.e., hot objects). The computation of demand statistics for a particular object O1 is illustrated in FIGS. 9(a) through 9(c). A skilled artisan should appreciate that there exist many ways of computing these statistics in order to increase the confidence and accuracy of its estimates.

FIG. 9(a) illustrates a stream of requests (1110) as observed by a controller with each request being associated with an object identifier. FIG. 9(a) further illustrates the generation of a request density statistic for each object identifier in the request stream for object O1. The example depicted in FIG. 11(a) illustrates the computation of the statistic during tour successive time intervals (for example, T(n−2) (1111) and T(n) (1112)). The density demand statistic is computed as the number of requests per bounded time interval T(j). This example shows the demand statistic to change from 3/T during the first interval to 4/T on the second interval, to 5/T in the third interval, to 7/T in the last interval shown. It should be noted that demand statistics may be smoothed before being used by the controller so as to increase their robustness.

FIG. 9(b) illustrates via an example the monitoring of demand trends for the request stream in each time interval shown in FIG. 9(a). During each interval T(j), for each incoming request for a given object, the controller updates a request counter (not shown). The example shows a predicted increase in demand for object O1 at time t(p) based on the steady increase in requests for the object O1 in prior time intervals.

FIG. 9(c) depicts a further example of the schema and data structure (696) used to store the demand statistics maintained for each replica. For each object identifier, the controller stores statistics about its predicted demand. In accordance to current practices in forecasting and smoothing, moving window statistics are used. A time interval (herein referred to as T) is used to smooth demand statistics. A moving window of size K*T is used to forecast demand statistics. The type of smoothing technique used (e.g., exponential smoothed or uniform smoother) and the desired robustness or confidence on the smoother determines the number of intervals to smooth (K). The size of the time interval used for updating demand statistics should be sufficiently large, as this is needed to: (a) reduce overheads, (b) smooth transient effects, and (c) span a sufficiently large number of requests. On the other hand, the smaller values of T and K allow the controller to react more rapidly to changes on demand. Reasonable values in current practice for the internet domain are the use of an exponential smoother with K=2 and T=[60, . . . , 3600] seconds. Thus, in an example data structure shown in FIG. 9(c), a request density statistic (1150) describes the density of requests associated with its corresponding object identifier as observed by this particular controller during the last few K time intervals T (i.e., j, j−1, . . . , j−k+1). The rate statistic (1170) provides a moving sum of the number of requests in the last K time intervals T. To assess whether demand for an object is high, the controller looks at the density and rate (volume) statistics and preferably both high density and rate (volume).

The means employed for monitoring and estimating available system capacity are provided via the deployment and use of a resource monitoring subsystem. The resource monitoring system interfaces to servers through a resource management protocol which enables a server to report its available system capacity via a MON_STATUS message. Particularly, the MON_STATUS message relays a forecast of its fixture availability to the controller. This forecast is not binding, nor is it considered a contract by the controller. Instead, the forecast is considered to be an indication of the willingness of such server to consider future CID_QUERY messages as described in aforementioned commonly-owned, co-pending U.S. patent application Ser. No. 09/335,272. In the preferred embodiment, the willingness of a server to consider new requests is a function of its available capacity as described below. For this reason, the controller refers to this as the utilization/willingness state of a server.

FIGS. 7(a) and 7(b) illustrate via an example, the particular watermark scheme (900) as prescribed by the preferred embodiment. The watermark scheme (900) is used by a server to map its utilization state into a normalized willingness indicator (990) that the controller may rely on across all servers.

Particularly, FIG. 9(a) depicts the utilization/willingness profile (960) of a particular server (Server 1) when subject to a utilization load. A RED condition (910) is used by a server to signal its controller that, currently, no more CID_QUERY messages will be considered by the server. A YELLOW condition (920) is used by a server to signal its controller that currently, no more CID_QUERY messages will be considered but that pending PLACE messages may be considered. Last, a GREEN condition (930) is used by a server to signal its controller that CID_QUERY messages will be considered. This flag is periodically updated by each server to indicate its current its utilization/willingness state. A server dispatches a MON_STATUS message to the controller only when it experiences a change on its willingness indicator. Although with three flags there are six conditions to consider, two conditions are considered important: 1) a change from GREEN to YELLOW/RED such as depicted at point (940); and, 2) a change from RED/YELLOW to GREEN (950).

FIG. 9(b) likewise depicts a different utilization/willingness profile (961) obtained from another server (Server 2) when subject to the same utilization as for Server 1. It should be noted that each server could independently set its RED, GREEN, and YELLOW watermarks to values that suit their individual willingness toward receiving CID_QUERY messages. In addition to the utilization/willingness state, a capacity rating is used to indicate whether the server is a HIGH capacity or a LOW capacity server. The capacity rating determination of a server may be made based on a straightforward threshold check in terms of the maximum number of concurrent streams that the server provides on its GREEN state. Heretofore, a GREEN replica is used to refer to as replica on a GREEN server. Similarly, a GREEN server is used to refer to a server for whom its last utilization/willingness state (990) was reported to be GREEN (930).

Referring back to FIG. 6, a resource monitoring/management protocol (671) permits a server to report its utilization/willingness state and its GREEN capacity rating to the controller. To report utilization/willingness and capacity to the controller, the server uses the MON_STATUS message which identifies the reporting server (e.g., via, its IP address or hostname), the controller, the time of the report at the server, the new utilization/willingness state, and a capacity rating (as will be hereinafter described).

It should be understood that a FIFO ordering transport mechanism may be enforced between servers and controller to ensure that messages are received in order. Each new MON_STATUS message overrides the last reported state for such corresponding server at the controller. However, if the capacity rating is left blank by the server, then no change is recorded by the controller for the capacity of such server. Moreover, if a MON_STATUS message is lost, the system recovers in the manner as follows: if the lost message indicated a change to RED (940) (FIG. 7(a)), then any subsequent placement (i.e., a CID_QUERY message) will not pass admission controls at the server. Such events are considered by the server as a violation of the placement agreements between controller(s) and servers. As a result, such RED server will, if necessary, re-issue a RED MON_STATUS message to the controller(s) in question in order to avoid receiving any further CID_QUERY placement messages.

A controller may request, if necessary, resource-monitoring state from a particular server. The resource monitoring protocol additionally allows the controller to query the utilization/willingness state, and in addition, determine the true available GREEN capacity of any server when evaluated for the requirements of a particular object identifier. This is accomplished via the MON_REQUEST message. The ability to poll a particular server is useful to the controller when deciding whether to place a new replica of an object on a global server as accomplished by a replica placement process (1400), as will be hereinafter described in greater detail.

The demand statistics and data structure (696) illustrated and described above with respect to FIG. 9(c), is used by the controller to track the reported capacity and utilization/willingness of its servers. As shown in FIG. 9(c), the demand statistics and data structure (696) maintains statistics associated with requests for each object identifier including: the predicted demand "d," a demand volume statistic or rate "r," i.e., the request activity for the object replica per time interval, and an indication of whether the requested object is a "hot object" representing a summary of its activity. Furthermore, a time-to-live timestamp is associated with each replica. Once the timestamp expires, the global server currently owning the transient replica requests a renewal from its controller (i.e., the controller who placed this replica). At this point, the controller may either drop the replica by denying its renewal or renew it by extending its time-to-live (thus repopulating the database with this new replica). If the controller denies the renewal, then the transient replica may end up being deleted by its global server. A skilled artisan will appreciate that periodical checkpointing of these data structures is desirable for fault tolerance. It should be noted that, in case of a data loss, this data will be reconstructed by having the controller query each individual server via the MON_REQUEST message. For servers for whom a report can not be made available, the corresponding utilization/willingness state is defaulted to RED and its capacity rating left blank until a MON_STATUS message is received from that server. This approach increases the controller's fault tolerance to server failures at the expense of under-utilization of such a server since no new placements will be assigned to such a server until its utilization/willingness state becomes GREEN again.

Shaping of Capacity

As mentioned, object replicas are enabled to migrate across servers in response to forecasts about predicted demand and available capacity. Consequently, the invention provides a mechanism for regulating the placement of not only requests but, more importantly, replicas throughout the network. This replica management technique may be based on characteristics of predicted request demand and available capacity.

Transient replicas have a dynamic lifetime determined by the controller. The lifetime of a transient replica depends, for example, on the demand against available capacity associated with its corresponding object as well as on the expected session duration of its object. For example, an aggressive deadline of, 2 hours could be used for a typical 90 minutes movie for which 30 minutes are allotted for both user interactions as well as lingering time for a deadline renewals from the controller. It is understood that a less aggressive deadline could be used (e.g., a 24 hour deadline for a 90 minute movie). Such strategy may be used when an object is expected to in demand for such time but its demand may not be sufficiently large to guarantee it to be hot for such duration of time. Additionally, the aforementioned time-tolive deadline of a replica may be re-set every time a new request is placed onto a transient replica.

Transient replicas always reside on global servers. The present invention introduces the use of global servers to provide storage and streaming resources for a dynamic set of replicas associated with a collection of objects. The controller is enabled to manage the dynamic placement of replicas onto global servers in response to some set criteria such as cost, demand, and capacity.

Figure 1:
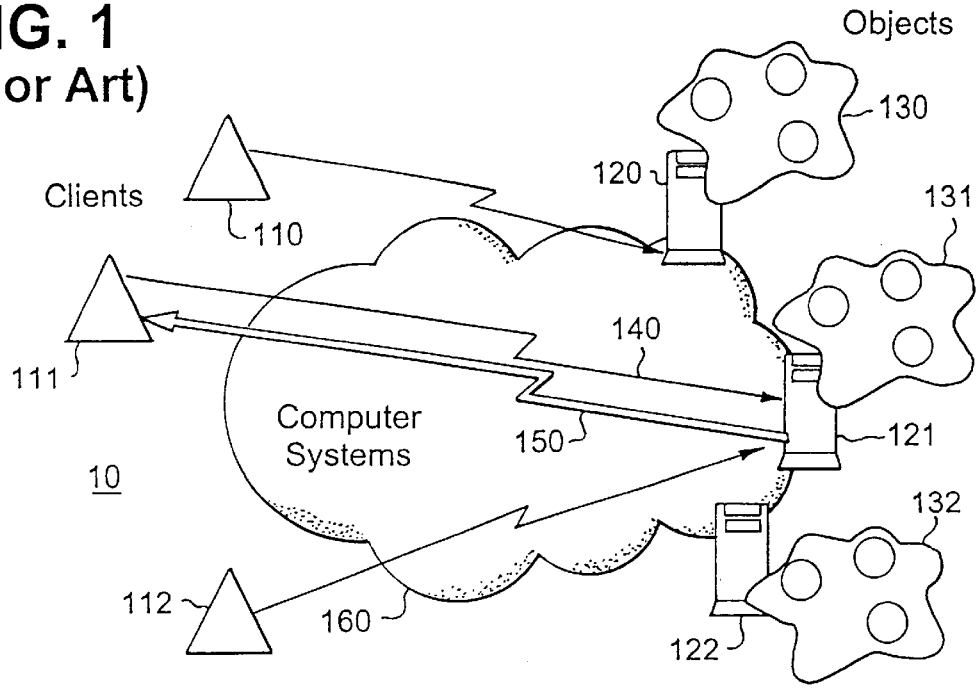
FIG. 1 illustrates a typical distributed computer system consisting of clients, servers, and objects stored in the server that may be requested for delivery to clients.
Figure 3:
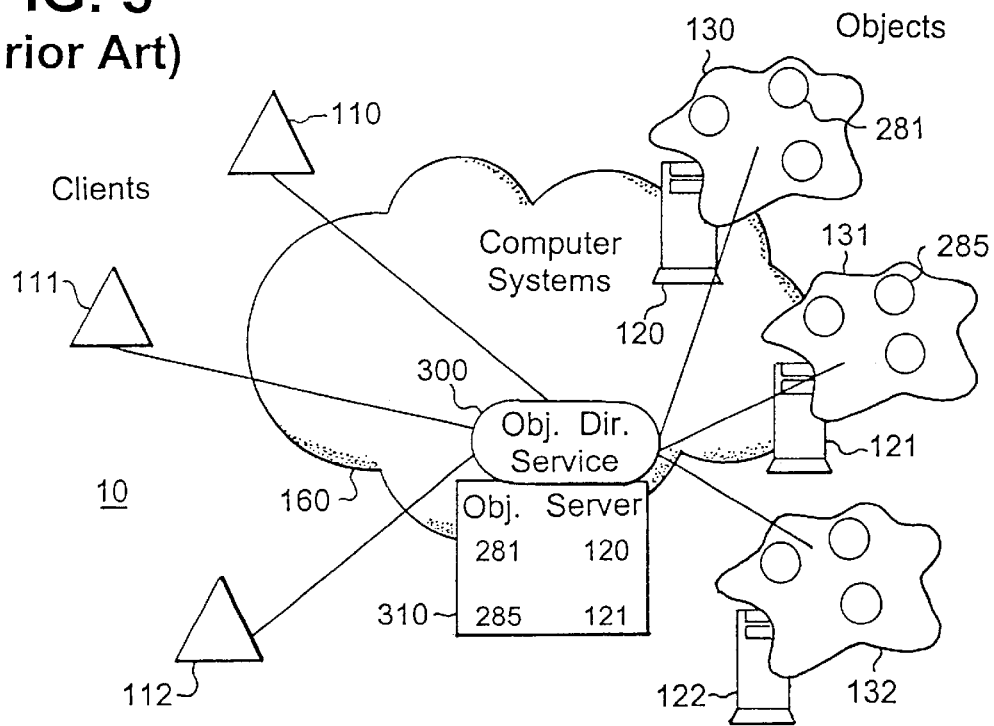
FIG. 3 illustrates a typical distributed object system including an Object Request Broker system enabling location and management of any object in the distributed collection.
Figure 2:
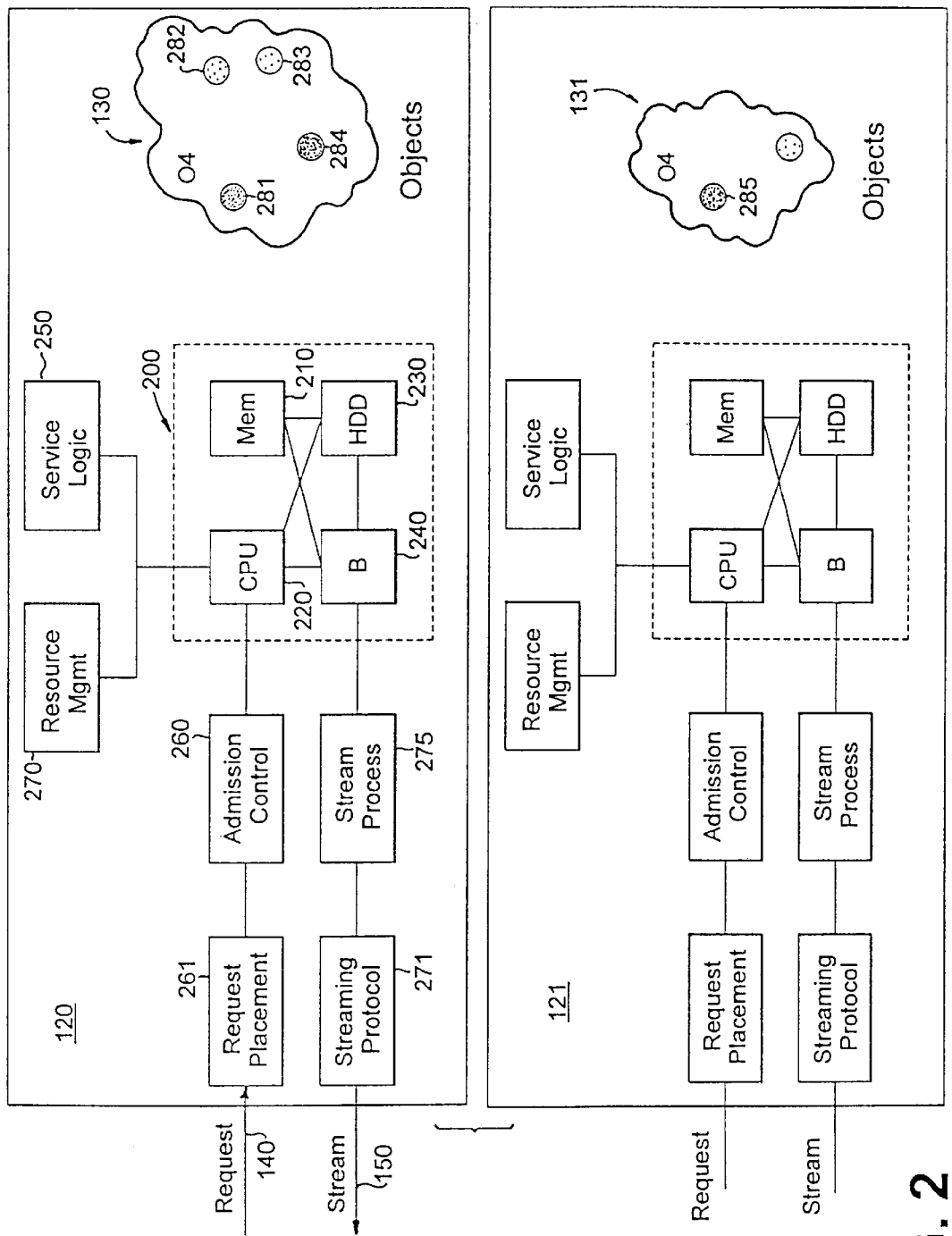
FIG. 2 depicts in further detail the components of the server devices found in the typical distributed computer system depicted in FIG. 1.

FIG. 8 illustrates in further detail the modeling of any server (1000) in the preferred embodiment. As stated before, a server provides both storage and/or streaming resources for these objects. However, the server (1000) is now divided into two independent partitions: a local partition (1010) and a global partition (1020). Both partitions provide independent storage and/or streaming resources for the objects on their collections (1011) and (1021). These collections (1011, 1021) are independently managed. However, whereas the local partition (1010) has a closed membership collection (1011), the global partition (1020) has an open membership collection (1021). As stated before, for a global partition, the membership is managed by the controller. It should be understood that a server may be dedicated to only one partition (i.e., 100% to one and 0% to the other). According to the preferred embodiment, a distributed system may comprise two separate types of servers: collections of (100%) local servers and collections of (100%) global servers. Thus, further to the embodiment of the server described herein with respect to FIG. 2, each partition (1010, 1020) in FIG. 8 comprises five software modules or processes, each of which is discussed below with corresponding enhancements identified.

The service logic (same as found in FIG. 2) provides application-oriented functions on the server. Examples of this application-oriented functionality are the billing and handling of client interactivity for any streaming session. The streaming process (275) provides the network streaming capability to deliver multimedia content from server to client. This functionality is typically performed in accordance to some standard protocol such as RTSP. An admission control process (1040) performs typical admission control tasks which are applied over queries from the controller. The admission control process (1040) evaluates a request and produces an admission offer to the controller (referred to as a candidate placement by the controller). The resource management process (1050) provides ehanced resource monitoring that enables the controller to determine aggregation oriented attributes about servers such as its utilization/willingness state of a server as well as its capacity. A resource management protocol describes the signaling that makes monitoring and querying of a server's state possible. Last, the replication management process (1030) represents a new process added into the server to enable the creation and deletion of transient replicas on global servers. A replication management protocol described herein provides the signaling requirements that makes on-demand replication of objects possible. Each of the signaling interfaces (1031, 1041, 1051, 1061) enable a server to comply with the corresponding placement management, resource monitoring, streaming, and replica management processes on the controller. As described, the collection of objects on a global server has an open membership. Objects may enter the collection based, for example, on factors such as predicted demand for a particular object. Similarly, objects may leave the collection based, for example, on factors such as the relative utilization or revenue for a particular object when compared to other objects in the collection. Management of this dynamic membership may be autonomously controlled by controllers via a replica management signaling protocol which is used to replicate objects across servers as well as to migrate replicas across global servers.

For example, a maximum number of transient replicas N may be enforced for any given object. This number may be determined a-priori or dynamically configured during runtime and each different object may have a different maximum number of transient replicas (i.e., $N(c\_id)$). Furthermore, the number of transient replicas associated with any given object will vary over time, e.g., may be autonomously increased when demand increases, the object is hot, or capacity is low, or, may be decreased when demand decreases, the object is no longer hot, or capacity is found to be sufficiently high for predicted demand.

With more particularity, the replica management system comprises four processes and a complementary signaling protocol (i.e., the replica management protocol) that operate to implement on-demand replication of objects. The replica management system is responsible for the regulation response of controllers over servers (i.e., the placement of replicas and/or requests) with such regulation response directed toward particular servers based on some set constraint accounting for attributes such as the resource capacity of servers. In particular, the placement of requests and replicas onto the same global server may be focused to satisfy explicit co-allocation constraints as set forth by clients and content authors, respectively.

In the present invention, the interaction between requests (i.e., demand) and replica (i.e., capacity) management systems consists of two demand-to-capacity (i.e., unidirectional) triggers referred to as preliminary scarcity and oversupply checks, respectively. On one hand, the preliminary scarcity check is used by the request management system to request an under capacity audit from the replica management system when demand for a particular object is predicted to increase. On the other hand, the preliminary scarcity check is used by the request management system to request an over capacity audit from the replica management system when demand for a particular object is predicted to decrease. If a preliminary test identifies a possible demand-to-capacity condition, a comprehensive analysis is requested from the replica management system, which could possibly lead, to the creation and/or deletion of replica(s). For this reason, these checks are referred to as preliminary, since their goal is to provide a balance between replica management overhead and aggressiveness.

The capacity shaping mechanism of the invention is to be activated on a number of conditions. In particular, as described in above-mentioned commonly-owned, co-pending U.S. patent application Ser. No. 09/335,272, a preliminary check by the request management system is used to identify a possible scarcity condition (defined therein as an undersupply in available capacity given predicted demand). This check is used to trigger the activation of the capacity shaping mechanism as described herein. Similarly, in U.S. patent application Ser. No. 09/335,272, a preliminary check is used to identify a possible oversupply condition (defined therein as an oversupply in available capacity given predicted demand). The check is used to trigger the activation of the capacity shaping mechanism as described herein. The present invention describes in detail the aforementioned capacity shaping mechanisms herein referred to as the replica management system.

The aforementioned integration of the replica management and request management systems (i.e., demand and capacity shaping) is now described in greater detail herein with respect to FIG. 12 which illustrates a high-level diagram depicting the interactions between the various processes of the replica management system as described below.

Figure 10:
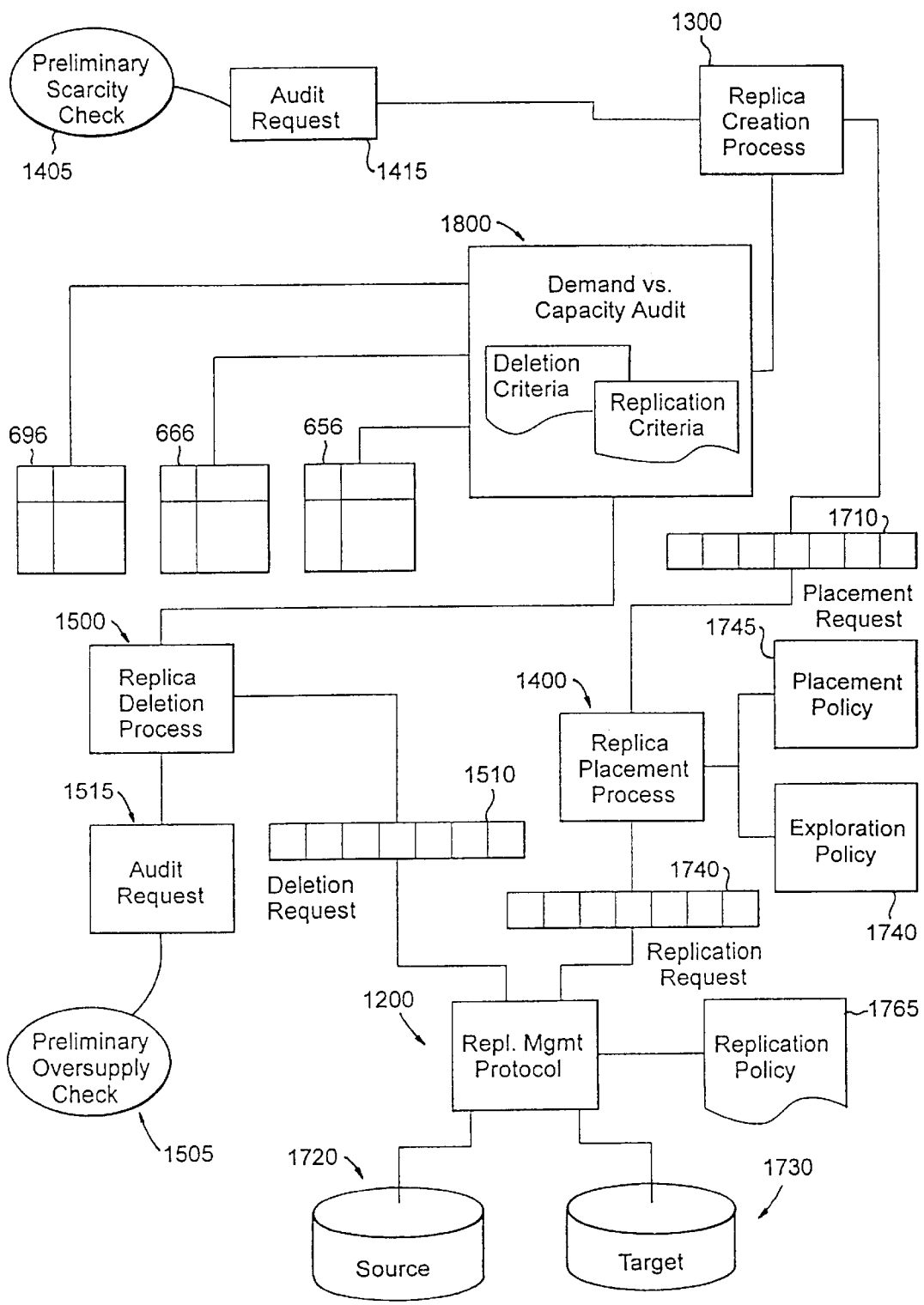
FIG. 10 depicts a high level diagram of the replica management process and its trigger-based interaction with the request management system.

As shown in FIG. 10, the preliminary scarcity audits check (1405) takes place after the establishment of a service binding on the request management system. The preliminary scarcity check (1405) as used in the preferred embodiment is depicted in further detail in FIG. 14(b).

Figure 14A:
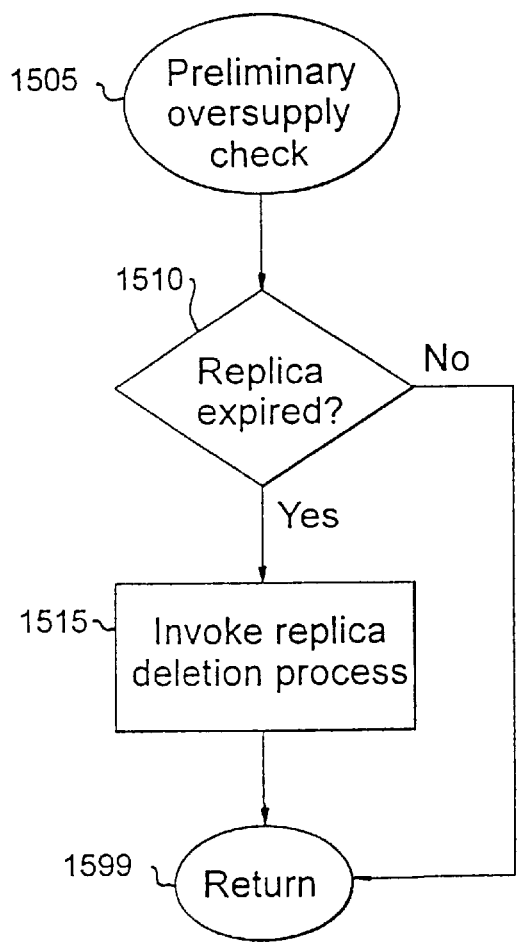
FIG. 14(a) is a flow chart depicting the preliminary oversupply check implemented by the request management system to activate the capacity shaping mechanism (i.e., the replica management system).
Figure 14B:
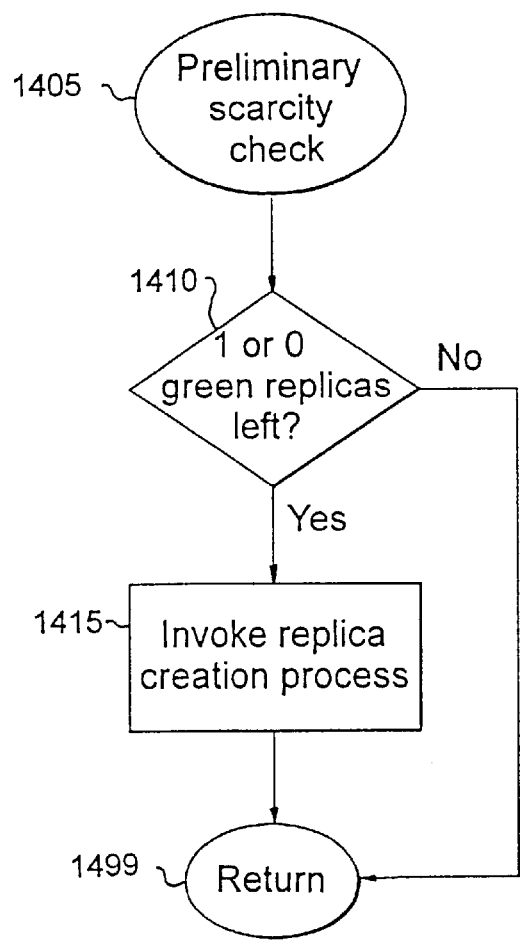
FIG. 14(b) is a flow chart depicting the preliminary scarcity check implemented by the request management system to activate the capacity shaping mechanism.

In the preferred embodiment, as illustrated in FIG. 14(b), the preliminary scarcity check (1405) determines if fewer than two GREEN replicas of the requested object are left (1410). A skilled artisan will appreciate that the scarcity check (1405) may be implemented in several different ways with varying degrees of robustness and aggressiveness. For example, preference may be given to a-priori set of selected objects. In such case, the preliminary scarcity check (1405) may be modified to reflect this bias. When a possible scarcity condition is identified, an audit request (1415) is raised to the replica creation process (1300). The audit request (1415) identifies the object (e.g., 420) in question. Its goal is to request a more comprehensive evaluation from the replica creation process (1300) for the specified object. The replica creation process (1300) as used in the preferred embodiment is depicted in further detail in FIG. 11. Particularly, the replica creation process (1300) is run only when such an audit request (1415) is raised, otherwise, no audit is triggered (1499). The creation of a replica causes a corresponding update of the replica directory (656).

In further view of FIG. 10, the goal of the replica creation process (1300) is to determine whether there is a true need for a new replica for the object specified in the audit request (1415) (for example, object O1). If need for a new replica is found, a placement request (1710) is queued to the replica placement process (1400). The replica placement process (1400) as used in the preferred embodiment as depicted in further detail in view of FIG. 12. The placement request (1710) indicates that the specified object (e.g., O1) has met the replication criteria and that a replica ought to be made. The replication criteria (1800) as used in the preferred embodiment is depicted in further detail in FIG. 15. In particular, the replication criteria implements a demand to capacity assessment. In the preferred embodiment, this assessment relies on controller-based data structures such as the demand statistics (696), the replica directory (666), and the server directory (656).

The replica placement process (1400) selects a pending placement request (e.g., 1710) and, for such request, it determines the placement of a new replica, if one is possible. A skilled artisan will appreciate that it is possible that several pending placement requests may be queued and a cost metric criteria (Placement policy) (1745) may be used to prioritize the replication of objects when replication resources are low. In the preferred embodiment, a FIFO ordering is used.

As further shown in FIG. 10, a goal of the replica placement process (1400) is to identify, based on some set criteria (1440), a source server (see 1720) and target server (1730). In the preferred embodiment, the controller explores and negotiates (1440) replication options in a manner similar to the placement of requests as described herewith. This is done by invoking the querying functions provided by the replica management protocol (1200) depicted in FIG. 10 and described in greater detail with respect to FIG. 16.

Once source (1720) and target (1730) servers are identified, i.e., options accepted at step (1450), the replica management protocol (1200) queues a replication request (1740) for the corresponding placement request (1710). This is done by invoking the replication functions provided by the replica management protocol (1200). A skilled artisan will appreciate that several conditions may arise during replication. In the preferred embodiment, a replication policy (1765) allows the customization of exception handling under the replica management process as described herewith.

Figure 13:
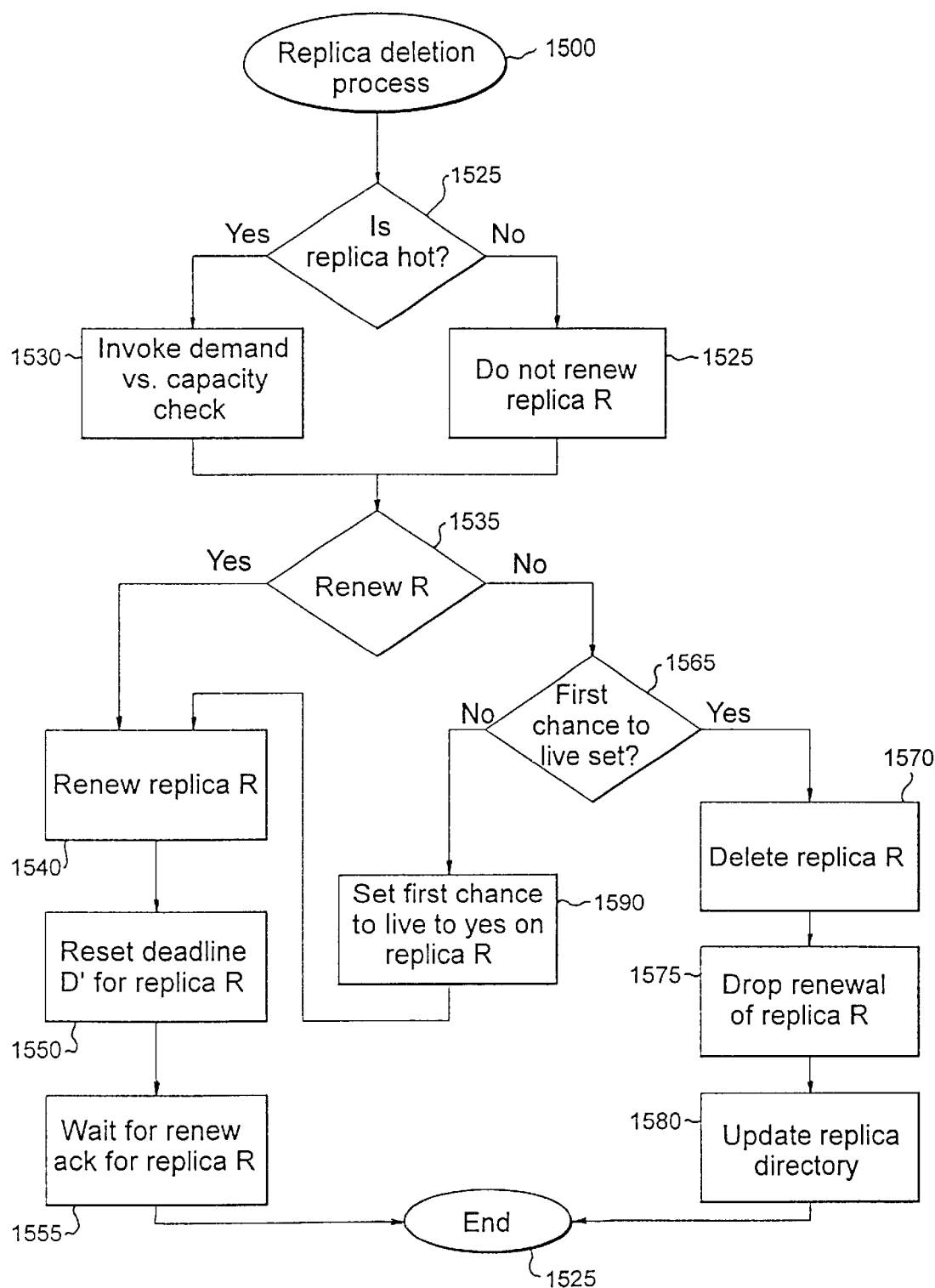
FIG. 13 is a flow chart depicting the replica deletion process.

Similarly, the replica management system provides the ability to delete a replica. A preliminary oversupply check (1505) is used by the request management system to identify a possible oversupply condition. The preliminary oversupply check (1505) as used in the preferred embodiment is depicted in further detail in FIG. 14(a). The preliminary oversupply audits check (1505) takes place during the termination of a service binding. Moreover, it is also applied whenever a server requests a renewal of a transient replica. When a possible oversupply condition is identified, an audit request (1515) request is raised to the replica deletion process (1500). The replica deletion process (1500) as used in the preferred embodiment is depicted in further detail in FIG. 13.

Figure 15:
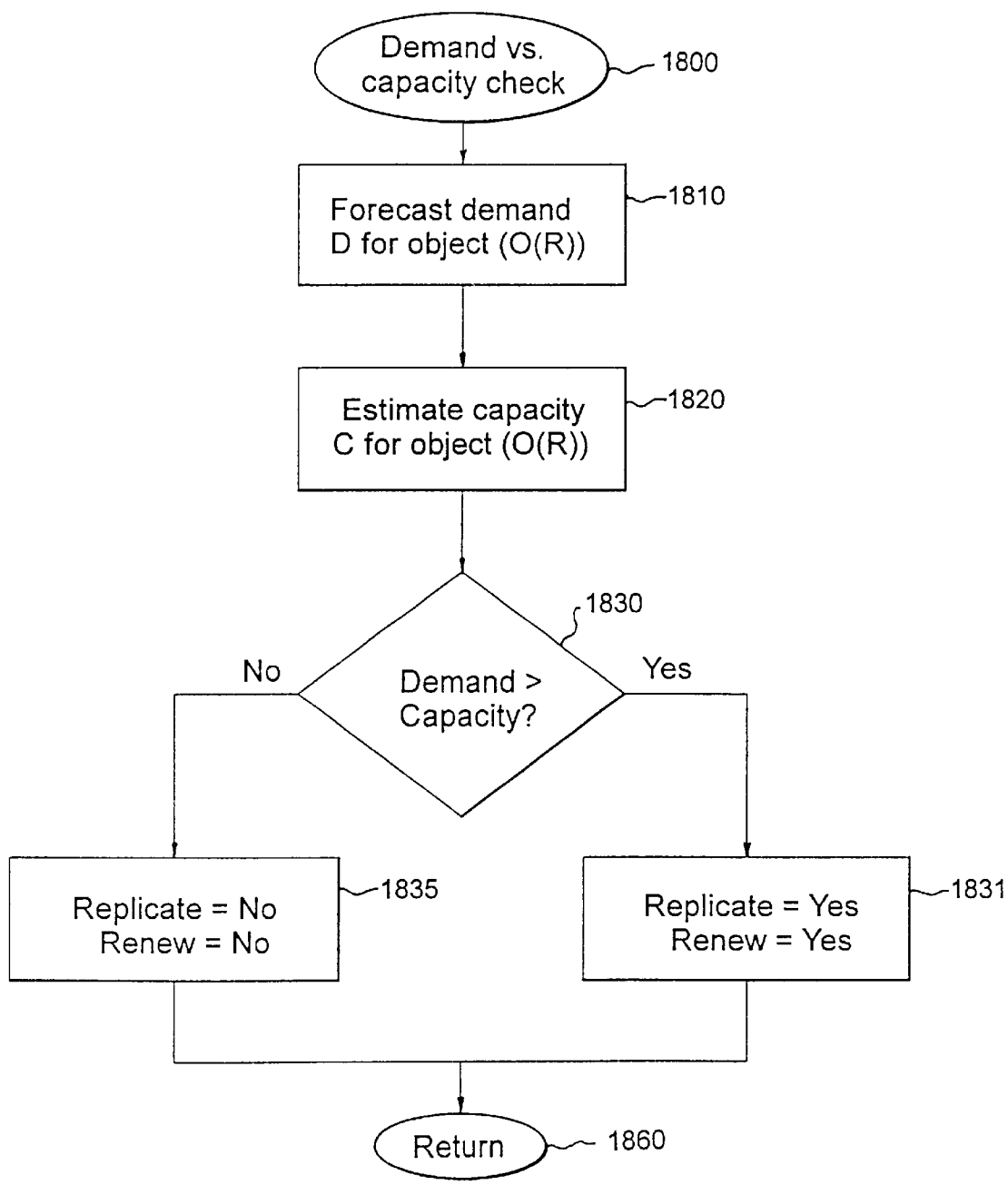
FIG. 15 is a flow chart depicting the demand vs. supply check used in the preferred embodiment.

The goal of the replica deletion process (1500) is to determine whether to delete a particular replica based on global demand vs. capacity criteria (1800) for its associated object. In the preferred embodiment, a transient replica is considered a candidate for deletion based on complex criteria based on its time-to-live deadline, demand vs. capacity, and the "hotness" of the object. The deletion criteria (1800) used in the preferred embodiment is depicted in FIG. 15. In particular, the deletion criteria implements a demand to capacity assessment.

It should be noted that in the preferred embodiment, deletion and replication criteria are the reciprocal of each other. That is, the condition to renew a replica is the same as to create a new replica the first time around. The replica deletion process (1500) as used in the preferred embodiment is depicted in further detail in FIG. 13. If the replica deletion process (1500) finds cause to delete a replica, the replica management system simply denies the renewal of a replica (i.e., the renewal of the replica's time-to-live deadline). The deletion of a replica causes a corresponding update of the replica directory (656).

Figure 11:
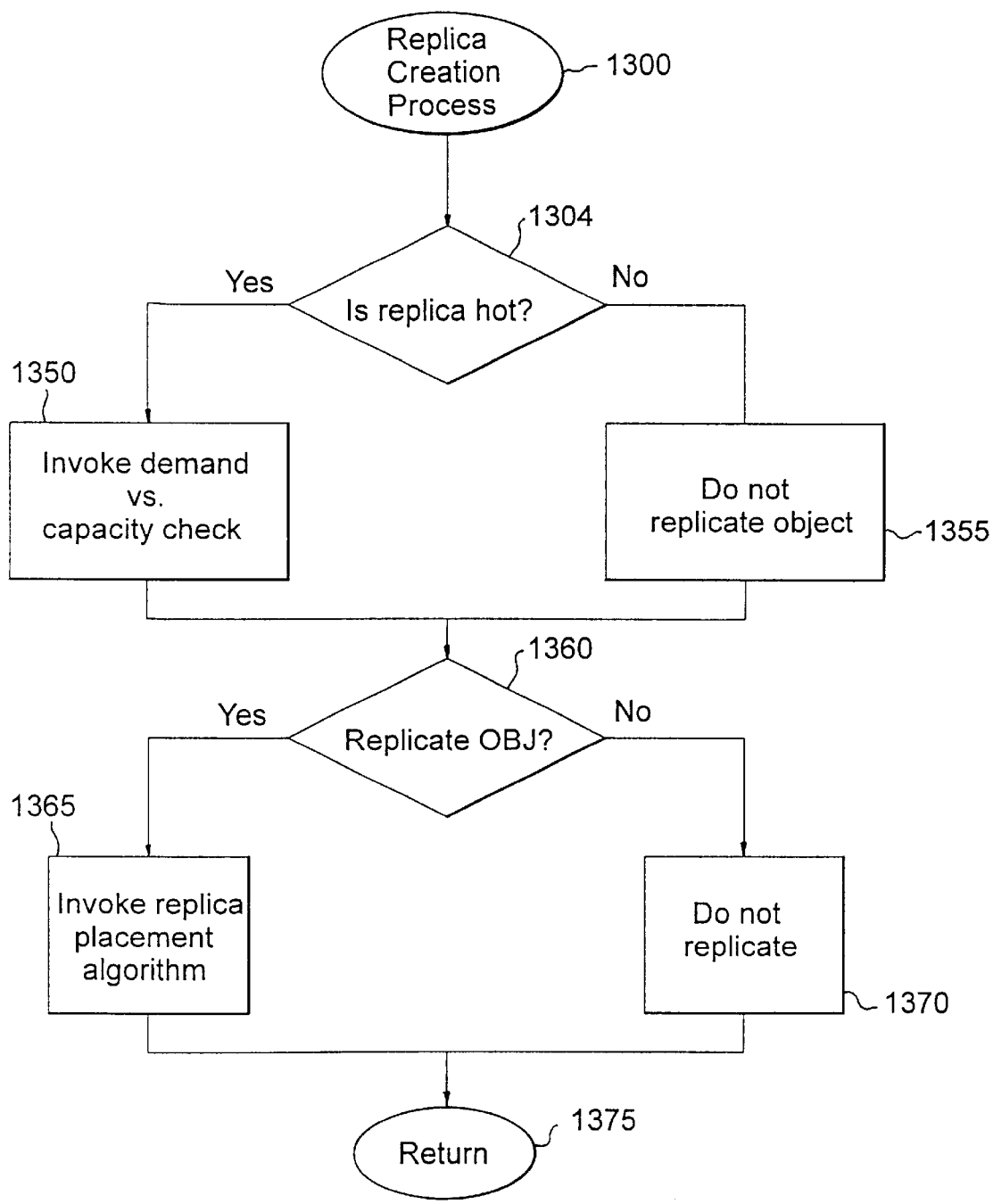
FIG. 11 is a flowchart depicting the replica creation process.

FIG. 11 is a flow-chart depiction of the replica creation process (1300). As mentioned, the goal of the replica creation process (1300) is to determine whether a new replica needs to be created for the requested object. When an audit request (1415)(FIG. 10) is received at step (1300), the replica creation process determines whether the requested object is a member of the set of hot objects (1304). If the object is hot, a comprehensive scarcity check is requested at step (1350). This check is referred to as a demand vs. capacity check and it is depicted in detail in FIG. 15 (described below). On the other hand, if a replica is not a member of the set of hot objects (1355), the controller decides it is not yet time for replication (1360, 1370) and no replica is thus created (1375). However, at step (1360) it may be determined that the controller create a replica even if the object is not "hot". For example, preference could be given to some selected objects based on some cost criteria, thus allowing preferential replication for objects associated with, for example, a higher cost benefit. Thus, at step (1365) the replica placement algorithm is invoked as depicted in FIG. 12.

FIG. 18 is a flow chart depicting a process (1800) for checking the demand vs. capacity. According to step (1830), a determination is made as to whether the predicted demand (determined at step 1810) for a particular object exceeds available capacity (determined at step 1820). At step (1830), if the predicted demand is greater than available capacity, the controller considers the requested (hot) object as a replication candidate as indicated at step (1831). In such a case, the requested object is placed in a replication queue and the replica placement process (1400) is then invoked (1365 as shown in FIG. 12). On the other hand, if predicted demand is less than available capacity, the controller decides it is not yet time for replication as indicated at step (1835).

It should be noted that the scarcity of GREEN replicas (1415 as shown in FIG. 14(*b*)) is just a trigger used to throttle the replica creation process (1300). The actual decision to create a new replica (1360) (FIG. 11) is examined at step (1830) and made on (1831) only when predicted demand (1810) significantly exceeds available capacity (1820) as illustrated in FIG. 15. As stated before, a smoothed demand statistic is used to robustly forecast predicted demand for each object. On the other hand, the server utilization/willingness state (990) (e.g., FIG. 7(*a*)) and its server capacity rating are used to loosely forecast server capacity (for example, the number of GREEN servers left). It should be noted that the MON_REQUEST message may also be used to query a GREEN server for a robust estimate of its remaining capacity. To the controller, such estimate would be useful only if it is translated to the particular requirements of the object for which a replica evaluation is being made. This would produce the number of further placements that such server would be able to provision if reserved exclusively for this object. In the preferred embodiment of FIG. 15, if this number (1820) is less than the predicted demand (1810) associated with the requested object, a decision to create a new replica is made (1831).

Figure 12:
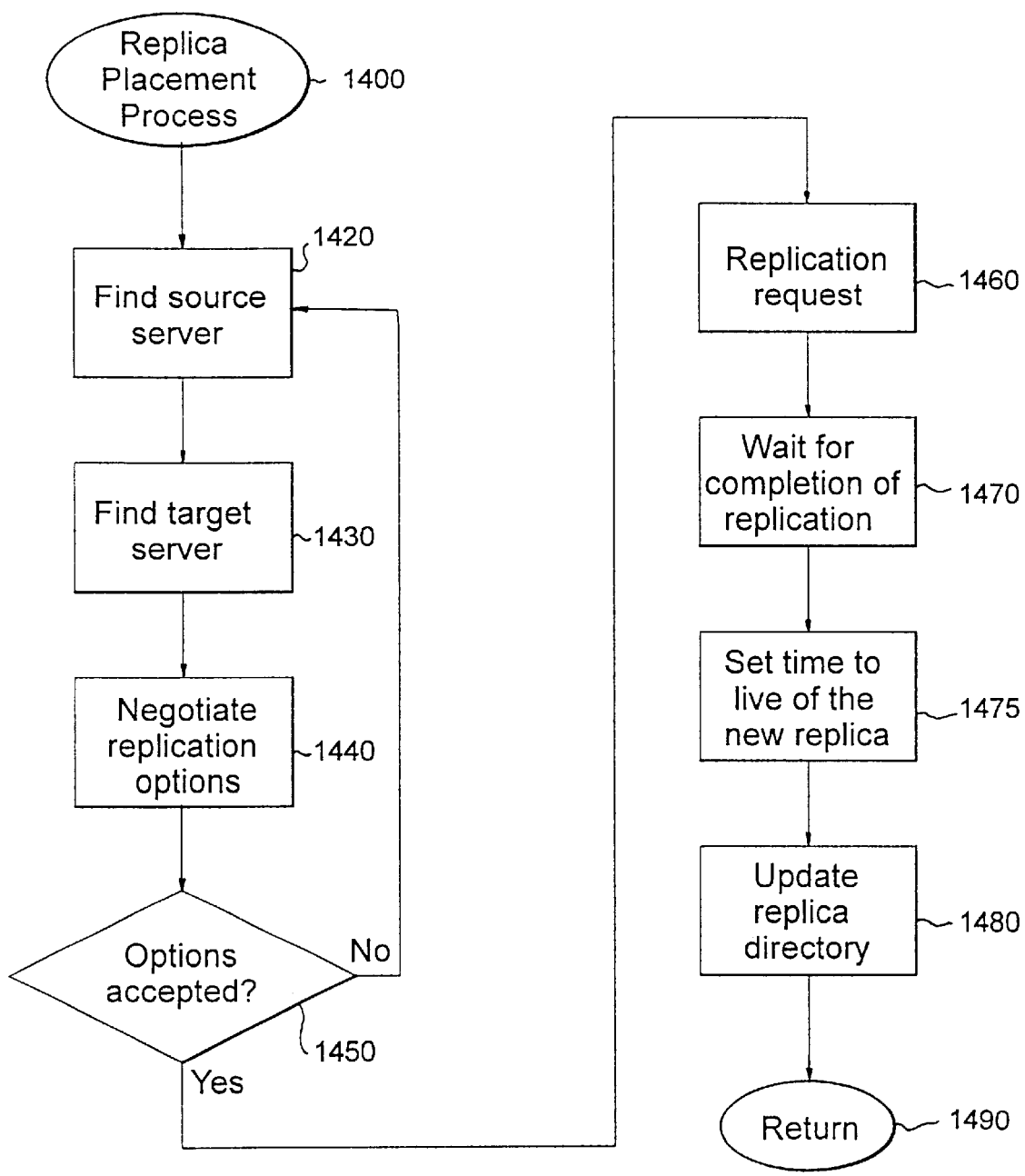
FIG. 12 is a flow chart depicting the replica placement process.

After the replica creation process determines a new replica is needed for a given object, the replica placement process (1400) described with respect to FIG. 12, is invoked to determine whether a placement for this replica may be found.

FIG. 12 is a flowchart illustrating the replica placement process (1400) implemented for finding a target global server as indicated at step (1430) based on factors such as capacity. In addition to finding a target server, the replica placement process (1400) also attempts to find a source server as indicated at step (1420) from which to initiate the replication. To this end, the controller engages in an exploration and negotiation process, as indicated at step (1440) of candidate source and target servers. Preferably, the exploration and negotiation may be iterative in nature with the process returning to step (1420) to find new source and target servers if options are not accepted as indicated at step (1450). This exploration and negotiation is accomplished via the use of a query functions (REP_QUERY/RQ_ACK messages) provided by the replica management protocol as illustrated by way of example in view of FIG. 20. For example, during the exploration of source (1420) and target (1430) servers, the replica placement process (1400) negotiates replication options (1440) such as, for example, determining the streaming rate at which to replicate (and its corresponding bandwidth requirement). It should be understood that the replicated object may be transformed during replication. For example, the object to be replicated may be downgraded to a lesser quality during the negotiation of options shown in FIG. 12 (1440). Similarly, the object may be encoded into a different format or may be augmented with content related or not related to the original content of the object.

Having agreed to a replication option, the process proceeds to step (1460) where a replication request is made. Preferably, the replication request (1460) is placed onto a GREEN global server that currently does not hold another replica of the selected object. If more than one such GREEN global servers exists, then according to the preferred embodiment, preference is given to the nearest global server based on some cost criteria such as the available capacity associated with the object being requested.

It should be noted that in the preferred embodiment, the preliminary scarcity criteria (FIG. 14(*b*)) would result that, in most cases, either zero or one GREEN replica (i.e., potential source servers) is left. Moreover, it is possible that no remaining GREEN target servers will be found. Furthermore, it should be noted that in the preferred embodiment, the replica placement process does not explicitly reserve resources on either source nor target server. For these reasons, the preferred embodiment of the invention relies on the privileged use of the remaining YELLOW/RED capacity of any such server (source or target). The replica placement process (1400) relies on the use of the out-of-bounds, over-engineered capacity of a server (i.e., YELLOW/GREEN capacity) to place the replication request (1460). That is, the replica placement process (1400) is allowed to place a replication request (1460) onto any capable YELLOW server if no GREEN server is found available for the selected object. To do so, it is necessary that admission controls (1040) at a server be enhanced to differentiate between replication placements and request placements. Alternately, if no remaining GREEN replica is available, the replica placement process may queue the replication request (1460) until once such GREEN replica becomes available.

Returning to FIG. 12, after source and target servers are chosen, a replication request is placed to both servers as indicated at step (1460). The signaling needed for the handling of such a replication request is illustrated in further detail in FIG. 20 by way of example. At step (1470), the controller waits for a positive acknowledgment from the selected target server that the replication has been completed. Then, at step (1475), an expiration deadline is assigned to the replica, herein referred to as the replica's time-to-live deadline, which imposes a (renewable) bound on the lifetime of a transient replica on a global server. Next, at step (1480), the controller updates its replica directory (656). After this, the new replica is made available (1490) for future placements.

Depending on the negotiated options (step 1440), replication may be time consuming. Thus, according to the invention, requests placed during the replication may be: deferred (in time), handed-off (to another controller), or refused by the controller depending on some set criteria.

A skilled artisan will appreciate that, during this time, it is possible for the reported utilization/willingness state of servers to change. On one hand, it is possible that while a transient replica is being created (step 1470), one or more servers become available (i.e., GREEN) causing capacity to exceed demand. In this case, the time-to-live of the newly created replica would then determine the duration of the oversupply.

On the other hand, it is also possible that by the time that the new replica becomes available, no available capacity is left (i.e., no GREEN servers are found) causing demand to significantly exceed capacity. In such case, the placements made during scarcity would trigger additional replica creation audits. For this reason, it is necessary to limit the maximum number of replicas to be created for any particular object. A skilled artisan will appreciate that for the sake of stability in such cases, the new audit requests may be queued for some amount of time. Then, after such time, a re-check is made to determine whether the preliminary scarcity condition is found to be persistent (i.e., during the queuing time no GREEN replicas became available). Clearly, if this amount of time is too long, then requests for this object may be dropped or handed-off to another controller.

Figure 16:
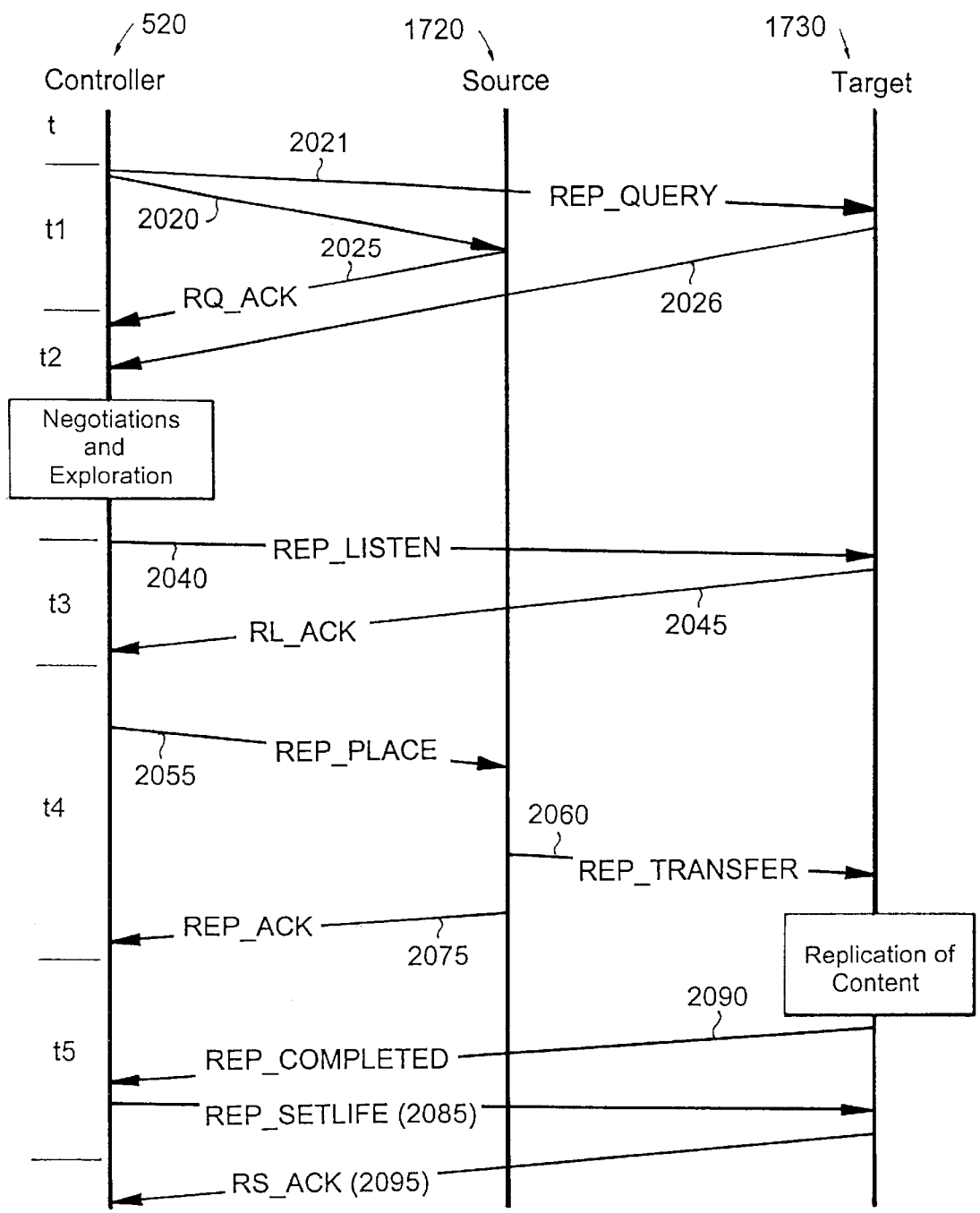
FIG. 16 illustrates a timeline diagram for the replication management protocol.

FIG. 16 illustrates one embodiment of the replica management protocol (1200) for enabling the controller (520) to create and delete transient replicas on global servers. Once the controller determines need and placement for a new replica, the controller proceeds to find a source server (e.g., 1720) and then negotiates a replication connection with one or more such servers. This is shown as the REP_QUERY (2020)/RQ_ACK (2025) message exchange. The REP_QUERY (2020) message contains the object identifier of the object to replicate along with negotiation parameters.

When a server (e.g., 1720) receives the REP_QUERY message (2020), it applies admission control and determines whether to accept the replication connection. A reader versed in the arts would appreciate that the REP_QUERY message (2020) is functionally very similar to the CID_QUERY message. However, as stated before, it is necessary to differentiate between placement and replication queries to be able to provide privileged admission controls (i.e., YELLOW admissions) to replication requests. After applying privileged admission controls to the replication request (2020), each potential source server (e.g., 1720) relays its admission response to the controller via the RQ_ACK message (2025). It should be noted that each such server response (2025) may indicate: (i) acceptance of the negotiation parameters provided on the REP_QUERY message (2020) by the controller (520), (ii) negotiate, or (iii) reject the negotiation parameters provided on the REP_QUERY message (2020) by the controller (520).

During this time, the controller also explores the set of feasible target servers as described before (see 1730) via the use of another REP_QUERY (2021)/RQ_ACK (2026) message exchange. Each potential target server (e.g., 2010) applies privileged admission controls (as described above) to the replication query REP_QUERY (e.g., 2021) and relays its admission decision to the controller (2000) via the RQ_ACK message (2026).

In a manner similar to the placement of CID_QUERY messages, the controller (520) collects RQ_ACK messages (e.g., 2025 and 2026) from source and target servers and then chooses between candidate replication placements. Similarly, if no candidate replication placements are received, the controller resorts to further exploration according to its replication policy (see 1765) (FIG. 10).

Next, once the controller (520) chooses source and target servers, a REP_LISTEN message (2040) is sent to the target server (1730). The REP_LISTEN message identifies the object to be replicated (e.g., object O1), the source server (e.g., 1720), and the target server (1730). In addition, the REP_LISTEN message (2040) contains the replica's time-to-live deadline as determined by the controller. As previously mentioned, the time-to-live deadline is used to determine the lifetime of a transient replica on the server and enable the deletion of content no longer in use. The REP_LISTEN message (2040) causes the global server (2010) to wait and listen for a replication connection from the server identified (e.g., 1720) in the REP_LISTEN message (2040). The target server sets up the resources for this replication connection and then acknowledges readiness to the controller (520) via the RL_ACK message (2045).

After the target server (1730) acknowledges readiness via the RL_ACK message (2045), the controller (520) issues a REP_PLACE message (2055) to the selected source server (2005). The REP_PLACE message (2055) identifies the object to be replicated, the source server (1720), and the target server (1730). The REP_PLACE message (2055) instructs the source server to initiate a replication connection to the target global server. The source server (1720) schedules and sets ups a replication connection to the target server (1730).

After the source server (1720) sets ups its replication connection, the source server acknowledges the start of the replication connection to the controller (520) via the RP_ACK message (2075). At the same time, the replication of content is initiated at the previously negotiated parameters via the use of one or more REP_TRANSFER messages (2060). Each REP_TRANSFER message (2060) contains data necessary to reconstruct the fragmented content at the target server (e.g., sequence number, number of bytes, etc.).

After the content is replicated, the target server (1730) announces the creation of a new replica to the controller (520) via the REP_COMPLETED message (2090). The REP_COMPLETED message contains the object identifier of the replicated object. A REP_SETLIFE message (2085) is used by the controller to relay the renewal and its associated new deadline to the global server holding the transient replica. The controller waits (1555) until the global server in question acknowledges the renewal via the RS_ACK message (2095). The controller then updates (1480) its replica management directory (656) for future reliance on this newly created transient replica at global server (1730) on subsequent placements.

It should be noted that the creation of the new transient replica does not reserve resources at a global server. Instead, on-demand replication is used to increase the likelihood of finding available capacity during subsequent requests for the same object.

As replicas are not permanent but are rather associated with a time-to-live deadline, the replication mechanism assigns an expiration deadline to every replica it creates. When the expiration deadline for a replica expires, its global server requests a renewal of the replica's expiration deadline. If this effort is unsuccessful, the replica may be deleted from the global server causing its resources to become available.

According to the preferred embodiment, the replica management system trims capacity during sustained and significant decrease in demand for an object. In the present invention, the replica management system autonomously determines whether a replica ought to be deleted. In particular, every time that a service binding is terminated, the server associated with the service binding sends a CID_COMPLETED message to the controller. Among other things, the CID_COMPLETED message causes the controller to apply a preliminary oversupply check to this particular replica. In addition, the preliminary oversupply check (1505) is also triggered by a server whenever the renewal of a replica is requested.

Preferably, oversupply checks are performed to determine if, for a particular object, available capacity significantly exceeds predicted demand. In particular, the preferred embodiment recognizes various symptoms of oversupply such as, but not limited to: low utilization across one or more replicas, the existence of replicas for objects found not to be hot, and the expiration of a replica's time to live deadline. Thus, a skilled artisan will appreciate the interaction between the maximum number of hot objects and the lifetime of transient replicas. If the lifetime of a transient replica is chosen to be too large, replicas of possibly no longer hot objects may reside in global servers while replicas of currently newly hot objects may be awaiting an available GREEN global server.

The preliminary oversupply check (1505) used by the preferred embodiment is shown in FIG. 14(a). A transient replica is audited for deletion if its time-to-live deadline is found to be expired (1510). In such case, the replica deletion process (1500) is invoked at step (1515) to perform a more comprehensive analysis. Otherwise, no action is taken (1599).

FIG. 15 illustrates the flowchart of the replica deletion process (1500) for determining whether an audited replica ought to be deleted. Conversely, the replica deletion process (1500) also determines whether a replica ought to be renewed (1535). The replica deletion process (1500) first checks whether the replica is associated with a hot object (1525). At this point, the controller could either delete the replica by denying its renewal or renew it by extending its time-to-live. On one hand, if the replica is hot, a comprehensive demand vs. capacity check is invoked (1530) as described herein with respect to FIG. 15. On the other hand, if the replica is not hot (1525) or found to be in oversupply during the demand vs. capacity check (1530), the replica is considered a candidate for deletion.

In accordance to best current practices, actual deletion may be deferred (1565) until such replica is found to be a deletion candidate twice in a row (1570). A skilled artisan will recognize this practice as an instance of a second chance replacement algorithm as described in the reference "Operating Systems Concepts", Prentice Hall, Peterson and Silberschatz. If this is the first chance to live (1590) of this particular replica, the replica is then tentatively renewed (1540). A skilled artisan will appreciate that the second time-to-live deadline (1550) may be made smaller than the original one. A REP_SETLIFE message (2085) (FIG. 16) is used to relay the renewal and its associated new deadline to the global server holding the transient replica. The controller waits (1555) until the global server in question acknowledges the renewal via the RS_ACK message (2095) (FIG. 16). If a second chance to live have been given to the replica, the replica is to be deleted at step (1570). The controller then drops the renewal (1575) of the replica causing the global server to delete the replica. Once the decision to delete a replica is reached (1570), the replica directory is updated (1580), so subsequent placements would make use of this replica. It should be noted that in some implementations, the replica data structures need to be protected since multiple threads or processes would access them.

A skilled artisan will appreciate that other mechanisms may be used to shape capacity in a different way as opposed to one replica at a time. In particular, the shaping of capacity represents an adaptive rate control problem, and, as such, current best practices suggest the use of an asymmetrical compensation strategy. For example, a multiplicative increase (e.g., first time create one replica, second time create two replicas, third time create four replicas, and so on) coupled with a linear decrease (e.g., first time delete one replica, second time delete one replica, and so on) could be used. It is also possible to match the compensation effort (i.e., the number of replicas to create) to the increase in demand. In such an approach, the number of replicas to create is determined based on the difference between past and forecast demand such as described in Manohar, N, et al, "Applying Statistical Process Control to the Adaptive Rate Control Problem", Proc of SPIE MMCN '98, January 1998. Regardless, it is clear that a bound on the maximum number of replicas is desirable so as to bound the replication effort.

Furthermore, distributed implementations of the preferred embodiment of the invention are possible. For example, in one implementation, controller functionality may reside on each server. The delegate controller then performs demand and capacity monitoring tasks for the server and when critical thresholds are exceeded, the controller starts relying on the use of a global server. In particular, the same global server could be used across different controllers.

A reader versed in the arts will also appreciate that the particular implementation of the trigger controls described herein may be optimized for particular environments where demand and geographical patterns are known or could be robustly predicted.

While the invention has been particularly shown and described with respect to illustrative and preformed embodiments thereof, it will be understood by those skilled in the art that the foregoing and other changes in form and details may be made therein without departing from the spirit and scope of the invention which should be limited only by the scope of the appended claims.

Having thus described our invention, what we claim as new, and desire to secure by Letters Patent is:

1. A system for dynamically controlling an amount of object resources in a distributed network of servers, each server having a capacity for storing and streaming said object resources to clients, said system comprising:
   a) means for predicting a demand for object resource;
   b) means for monitoring capacity of said servers in said network for storing and streaming a requested object resource;
   c) means for dynamically generating one or more transient replicas of said object resource based on said predicted demand for said object resource and said available capacity, a transient replica having an associated expiration deadline indicating a degree of transiency; and,
   d) control means for automatically temporarily placing transient object replicas at servers throughout said network when demand is predicted to increase and one of: extending an expiration deadline of a transient replica upon expiration of said deadline according to predicted demand, or deleting replicas when demand is predicted to decrease.

2. The system as claim in claim 1, wherein said predicting means includes means for analyzing aggregated requests from different clients including characterizing a demand density and demand volume for a requested object resource.

3. The system as claim in claim 2, further including means for managing placement of dynamic replicas according to predetermined criteria.

4. The system as claim in claim 3, wherein said predetermined criteria includes cost.

5. The system as claim in claim 3, further including means for triggering an audit for comparing available capacity with predicted demand for a particular requested object, said audit for preliminary determining a possible under capacity condition indicating demand exceeding capacity or over capacity condition indicating capacity exceeding demand.

6. The system as claim as in claim 5, wherein said generating means includes means for locating a source server having said object to be replicated and a target server to which said object replica is to be placed.

7. The system as claim in claim 6, further including means for negotiating replication options including provisioning of a replication connection between a source server and a target server and a streaming rate at which to replicate said object.

8. The system as claim in claim 1, further including directory means for tracking status of each object, said status including current location and identity of a server storing a requested object.

9. The system as claim in claim 8, wherein said status further includes request activity for said object.

10. The system as claim in claim 6, wherein said target server is dedicated for receiving replicated objects and providing streaming resources therefor.

11. The system as claim in claim 10, wherein said target server is a spare, global server having an open membership for dynamically receiving object replicas, and configured as having controllable and shared capacity.

12. The system as claim in claim 6, wherein said replicated object has an associated expiration deadline, said expiration deadline being extended if an under capacity condition for said object exists, said object replica being otherwise deleted when said expiration deadline is reached.

13. The system as claim in claim 7, further including means for transforming an object replica to a lesser quality version during said replication process.

14. The system as claim in claim 1, wherein said object resources includes multimedia objects.

15. Method for dynamically controlling an amount of object resources in a distributed network of servers, each server having a capacity for storing and providing object resources, said method comprising:
   a) predicting a demand for an object resource;
   b) monitoring capacity of said servers in said network, said capacity including capability of storing object resources and streaming objects to a client;
   c) dynamically generating transient replicas of said object resource when said predicted demand for said object resource exceeds said available capacity and temporarily placing said transient object replica at a server located in said network; and
   d) extending an expiration deadline of a transient replica upon expiration of said deadline according to predicted demand, or deleting object replicas that have been temporarily placed when predicted demand for said object resource decreases.

16. The method as claim in claim 15, wherein said predicting step includes analyzing aggregated requests from different clients including characterizing a demand density and demand volume for a requested object resource.

17. The method as claim in claim 15, further including the step of managing placement of object replicas according to a predetermined cost criteria.

18. The method as claim in claim 15, wherein prior to said replicating step c), the step of initiating an audit for comparing available capacity with predicted demand for a requested object, said audit for preliminary determining a possible under capacity condition indicating demand exceeding capacity for said requested object.

19. The method as claim in claim 18, wherein prior to said deleting step d), the step of initiating an audit for comparing available capacity with predicted demand for a requested object, said audit for preliminary determining an over capacity condition indicating capacity exceeding demand.

20. The method as claim in claim 19, wherein said replicating step c) further includes the step of locating a source server having said object to be replicated and a target server to which said object replica is to be placed.

21. The method as claim in claim 20, wherein said replicating step c) further includes the step of negotiating replication options including provisioning of a replication connection between a source server and a target server and a streaming rate at which to replicate said object.

22. The method as claim in claim 20, wherein said replicating step c) further includes the step of assigning an expiration deadline to each replicated object, said method including the step of deleting an object replica when its associated deadline has expired.

23. The method as claim in claim 22, further including the step of extending said expiration deadline when an under capacity condition for said object exists.

24. The method as claim in claim 21, wherein said replicating step c) further includes the step of transforming said object replica according to a negotiated option.

25. The method as claim in claim 15, further including the steps of tracking a status of each object in said distributed network, said status including current location and identity of a server storing a requested object.

26. The method as claim in claim 15, wherein said monitoring step b) includes the step of implementing a signaling protocol between said servers, clients, and a controller device for enabling said servers to control dynamic placement of object replicas onto said servers.

27. A program storage device readable by a machine, tangibly embodying a program of instructions executable by the machine to perform method steps for dynamically controlling an amount of object resources in a distributed network of servers, each server having a capacity for storing object resources, and a streaming resource for delivering requested objects to clients, said method steps comprising:
   a) predicting a demand for an object resource;
   b) monitoring capacity of said servers in said network, said capacity including capability of storing object resources and streaming objects to a client;
   c) dynamically generating transient replicas of said object resource when said predicted demand for said object resource exceeds said available capacity and temporarily placing said transient object replica at a server located in said network; and
   d) extending an expiration deadline of a transient replica upon expiration of said deadline according to predicted demand, or deleting object replicas that have been temporarily placed when predicted demand for said object resource decreases.

28. The program storage device readable by a machine according to claim 27, wherein said predicting step includes analyzing aggregated requests from different clients including characterizing a demand density and demand volume for a requested object resource.

29. The program storage device readable by a machine according to claim 27, further including the step of managing placement of object replicas according to a predetermined cost criteria.

30. The program storage device readable by a machine according to claim 27, wherein prior to said replicating step c), the step of initiating an audit for comparing available capacity with predicted demand for a requested object, said audit for preliminary determining a possible under capacity condition indicating demand exceeding capacity for said requested object.

31. The program storage device readable by a machine according to claim 27, wherein prior to said deleting step d), the step of initiating an audit for comparing available capacity with predicted demand for a requested object, said audit for preliminary determining an over capacity condition indicating capacity exceeding demand.

* * * * *

UNITED STATES PATENT AND TRADEMARK OFFICE
CERTIFICATE OF CORRECTION

PATENT NO. : 6,466,980 B1
DATED : October 15, 2002
INVENTOR(S) : Leon Lumelsky et al.

It is certified that error appears in the above-identified patent and that said Letters Patent is hereby corrected as shown below:

Column 27,
Lines 12, 17, 20, 41, 45, 48, 54, 59 and 63, "as claim" should be -- as claimed --

Column 28,
Lines 1, 6, 10, 13 and 18, "as claim" should be -- as claimed --

Signed and Sealed this

Second Day of August, 2005

JON W. DUDAS
*Director of the United States Patent and Trademark Office*